(12) United States Patent
Shen et al.

(10) Patent No.: US 8,413,147 B2
(45) Date of Patent: Apr. 2, 2013

(54) METHOD, APPARATUS AND SYSTEM FOR MAKING A DECISION ABOUT VIRTUAL MACHINE MIGRATION

(75) Inventors: Qingni Shen, Shenzhen (CN); Lanfang Ren, Shenzhen (CN); Shaobin Wang, Shenzhen (CN); Yuanyou Jin, Shenzhen (CN); Lei Wei, Shenzhen (CN); Zhao Li, Shenzhen (CN); Anbang Ruan, Shenzhen (CN); Lei Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 280 days.

(21) Appl. No.: 12/982,243

(22) Filed: Dec. 30, 2010

(65) Prior Publication Data

US 2011/0099548 A1    Apr. 28, 2011

Related U.S. Application Data

(63) Continuation of application No. PCT/CN2010/074889, filed on Jul. 1, 2010.

(30) Foreign Application Priority Data

Jul. 1, 2009   (CN) .......................... 2009 1 0108609

(51) Int. Cl.
*G06F 9/46*     (2006.01)
*G06F 9/455*    (2006.01)
*G06F 15/173*   (2006.01)
*G06F 17/30*    (2006.01)
*H04L 29/06*    (2006.01)
*H04L 9/08*     (2006.01)

(52) U.S. Cl. ................ 718/1; 718/104; 718/105; 726/1; 726/2

(58) Field of Classification Search .............. 718/1–105; 709/223–226; 726/1–2; 713/150–155, 164–167, 713/300–340; 380/277–285
See application file for complete search history.

(56) References Cited

U.S. PATENT DOCUMENTS

| 8,321,862 B2 * | 11/2012 | Swamy et al. .................... 718/1 |
| 2005/0251802 A1 | 11/2005 | Bozek et al. |

(Continued)

FOREIGN PATENT DOCUMENTS

| CN | 1947096 A | 4/2007 |
| EP | 1 962 192 A1 | 8/2008 |

OTHER PUBLICATIONS

International Search Report issued in corresponding PCT Patent Application No. PCT/CN2010/074889, mailed Oct. 21, 2010.

(Continued)

*Primary Examiner* — Abdullah Al Kawsar
(74) *Attorney, Agent, or Firm* — Brinks Hofer Gilson & Lione

(57) ABSTRACT

A method, an apparatus, and a system for making a decision about virtual machine migration includes a source host platform, configured to send a migration request to a Migration Authority (MA), and to migrate the virtual machine to a target host platform according to a received migration decision-making result. The MA is configured to perform security checks on the source host platform and the target host platform, to obtain a first evaluation result of the source host platform and a second evaluation result of the target host platform, acquire a third evaluation result of the virtual machine, and return a corresponding migration decision-making result to the source host platform. The corresponding migration decision-making result indicates whether the virtual machine is permitted to be migrated; and the target host platform of the virtual machine to be migrated, is configured to accept the virtual machine to be migrated.

39 Claims, 12 Drawing Sheets

U.S. PATENT DOCUMENTS

| | | | |
|---|---|---|---|
| 2006/0010176 A1* | 1/2006 | Armington | 707/204 |
| 2007/0094719 A1* | 4/2007 | Scarlata | 726/9 |
| 2007/0204266 A1 | 8/2007 | Beaty et al. | |
| 2007/0239979 A1* | 10/2007 | Berger et al. | 713/150 |
| 2007/0266383 A1 | 11/2007 | White | |
| 2007/0283348 A1* | 12/2007 | White | 718/1 |
| 2008/0046960 A1* | 2/2008 | Bade et al. | 726/1 |
| 2008/0072287 A1* | 3/2008 | Movva et al. | 726/2 |
| 2008/0256530 A1* | 10/2008 | Armstrong et al. | 717/174 |
| 2009/0064136 A1* | 3/2009 | Dow et al. | 718/1 |
| 2009/0150529 A1 | 6/2009 | Tripathi | |
| 2009/0154709 A1* | 6/2009 | Ellison | 380/282 |
| 2009/0327781 A1* | 12/2009 | Tripathi | 713/324 |
| 2010/0332820 A1* | 12/2010 | Matsushima et al. | 713/150 |

OTHER PUBLICATIONS

Written Opinion of the International Searching Authority issued in corresponding PCT Patent Application No. PCT/CN2010/074889, mailed Oct. 21, 2010.

Extended European Search Report issued in corresponding European Patent Application No. 10788216.9, mailed Mar. 22, 2012.

Office Action issued in corresponding Chinese Patent Application No. 200910108609.X, mailed Aug. 13, 2012.

* cited by examiner

METHOD, APPARATUS AND SYSTEM FOR MAKING A DECISION ABOUT VIRTUAL MACHINE MIGRATION

CROSS-REFERENCE TO RELATED APPLICATIONS

This application is a continuation of International Application No. PCT/CN2010/074889, filed on Jul. 1, 2010, which claims priority to Chinese Patent Application No. 200910108609.X, filed on Jul. 1, 2009, both of which are hereby incorporated by reference in their entireties.

FIELD OF THE INVENTION

The present invention relates to the field of communication technology, and in particular, to a method, an apparatus and a system for making a decision about virtual machine migration.

BACKGROUND OF THE INVENTION

Virtualization technology includes introducing a virtual layer between software and hardware, so as to virtualize underlying physical devices into a plurality of virtual devices, and achieve the multiplexing of the physical devices through the scheduling of the virtual devices by each virtual computer (virtual machine). The virtualization technology can run a plurality of virtual machines on a hardware platform, the operations on hardware resources performed by the virtual machines and the interaction between virtual machines are mostly coordinated through the virtual layer, and there is not too much interaction in a virtual machine layer. The relation between the virtual machines is similar to that between two physical computers, and strong isolation is implemented. Due to the strong isolation between the virtual machines, failure of a virtual machine can hardly cause any influence to other virtual machines on the platform. The platform on which the virtual machines locate provides an independent and isolated operation environment for application software while fully utilizing the hardware resources, thereby maximally limiting a spread range of the security risk of application programs, and maintaining the stability of a system platform.

A virtual trusted platform has underlying trusted hardware as root of trust, so as to ensure that the platform can faithfully record and report a current status of the platform. The hardware generally means a trusted chip of a Trusted Platform Module (TPM). In a boot process of the platform, the TPM, an origin ensuring trusted attributes, performs integrity validation on a next member to be booted, and extends a trusted relation to the member. By performing integrity validation layer by layer, the platform can finally extend the trusted relation to an application program, so that a complete chain of trust is constructed from a Basic Input/Output System (BIOS), an Operating System (OS) boot program, an OS kernel program, and finally to the application program, thereby ensuring trusted attributes of the application software.

With the wide use of the virtualization technology, it is considered, in the field of the information security technology, to introduce a trusted computing technology into a virtualization application field, so as to ensure trusted attributes of a virtual machine. The virtual trusted platform ensures the effective extension of the trust chain based on the use of the virtualization technology, so that the conception of the trust chain is extended to virtual machines that run on a virtual platform, thereby ensuring that operating systems in the virtual machines also run in a trusted environment. Application programs that run on a guest operating system can use a TPM function like the case they use a TPM function on a traditional platform.

Virtual machine migration is an important advantage of the virtualization technology. At present, there are more and more application requirements for secure migration of virtual machines in industry, for example, load balance of a system platform is ensured through the migration of virtual machines, by migrating a virtual machine running on a platform with a heavier load to a platform with a lighter load, so as to ensure the full utilization of hardware resources on different platforms, and improve the system work efficiency. Alternatively, the dependence of an application program on underlying hardware resources is lowered through the migration of the virtual machine, so as to shorten a downtime. Alternatively, if underlying hardware needs to be maintained due to failure, too much influence caused by the failure of the underlying resources of the platform to the normal operation of the virtual machine can be prevented by migrating a running virtual machine to a normally working system platform.

The inventor found in implementation of the present invention that as the trusted computing technology is introduced to the virtualization application field, there is an urgent need in the industry for a virtual machine migration decision-making solution capable of ensuring the security of virtual machine migration in a virtual trusted platform.

SUMMARY OF THE INVENTION

The present invention is directed to a method for making a decision about virtual machine migration, an apparatus for making a decision about virtual machine migration, and a communication system, so as to improve the security of virtual machine migration.

The present invention provides the following technical solutions.

A communication system is provided. The system includes a source host platform of a virtual machine to be migrated, a Migration Authority (MA), and a target host platform of the virtual machine to be migrated, where:

the source host platform is configured to send a migration request to the MA, and migrate the virtual machine to be migrated to the target host platform according to a received migration decision-making result, wherein the received migration decision-making result indicates that the virtual machine is permitted to be migrated;

the MA is configured to perform security checks on the source host platform and the target host platform according to the migration request, to obtain a first evaluation result of the source host platform and a second evaluation result of the target host platform; acquire a third evaluation result of the virtual machine to be migrated; and return a corresponding migration decision-making result to the source host platform according to the first evaluation result, the second evaluation result, and the third evaluation result, wherein the corresponding migration decision-making result indicates whether the virtual machine is permitted to be migrated; and the target host platform is configured to accept the virtual machine to be migrated.

A method for making a decision about virtual machine migration is provided, where the method includes:

receiving a migration request sent from a source host platform of a virtual machine to be migrated;

performing security checks on the source host platform of the virtual machine to be migrated and a target host platform of the virtual machine to be migrated according to the migration request, to obtain a first evaluation result of the source host platform and a second evaluation result of the target host platform;

acquiring a third evaluation result of the virtual machine to be migrated; and returning a corresponding migration decision-making result to the source host platform according to the first evaluation result, the second evaluation result, and the third evaluation result, wherein the corresponding migration decision-making result indicates whether the virtual machine is permitted to be migrated.

An apparatus for making a decision about virtual machine migration is provided, where the apparatus includes:

a first receiving unit, configured to receive a migration request sent from a source host platform of a virtual machine to be migrated;

a first check unit, configured to perform security checks on the source host platform of the virtual machine to be migrated and a target host platform of the virtual machine to be migrated according to the migration request, to obtain a first evaluation result of the source host platform and a second evaluation result of the target host platform;

an acquisition unit, configured to acquire a third evaluation result of the virtual machine to be migrated; and a migration decision-making unit, configured to return a corresponding migration decision-making result to the source host platform according to the first evaluation result, the second evaluation result, and the third evaluation result, wherein the corresponding migration decision-making result indicates whether the virtual machine is permitted to be migrated.

According to the present invention, it can be seen that based on the security checks on the source host platform and the target host platform to obtain the corresponding evaluation results, a process of acquiring the third evaluation result of the virtual machine to be migrated is further included. Correspondingly, the bases of making a decision about whether to permit the virtual machine to be migrated include not only the first evaluation result of the source host platform and the second evaluation result of the target platform, but also the third evaluation result of the virtual machine to be migrated. That is, after the bases of making a decision about whether to permit the virtual machine to be migrated are taken into full consideration, a migration decision-making result is returned according to the first evaluation result of the source host platform, the second evaluation result of the target platform, and the third evaluation result of the virtual machine to be migrated, where the migration decision-making result indicates whether to permit the virtual machine to be migrated to the target platform, so that the migration is permitted on the basis of meeting the evaluation requirements from the target platform (that is, the third evaluation result of the virtual machine to be migrated is acquired), while the completeness of the decision-making bases is reinforced, thereby ensuring that the influence on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

BRIEF DESCRIPTION OF THE DRAWINGS

To illustrate the technical solutions according to the embodiments of the present invention or in the prior art more clearly, the accompanying drawings for describing the embodiments or the prior art are described briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

To make the objectives, technical solutions, and advantages of the present invention clear, the technical solutions of the present invention are clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
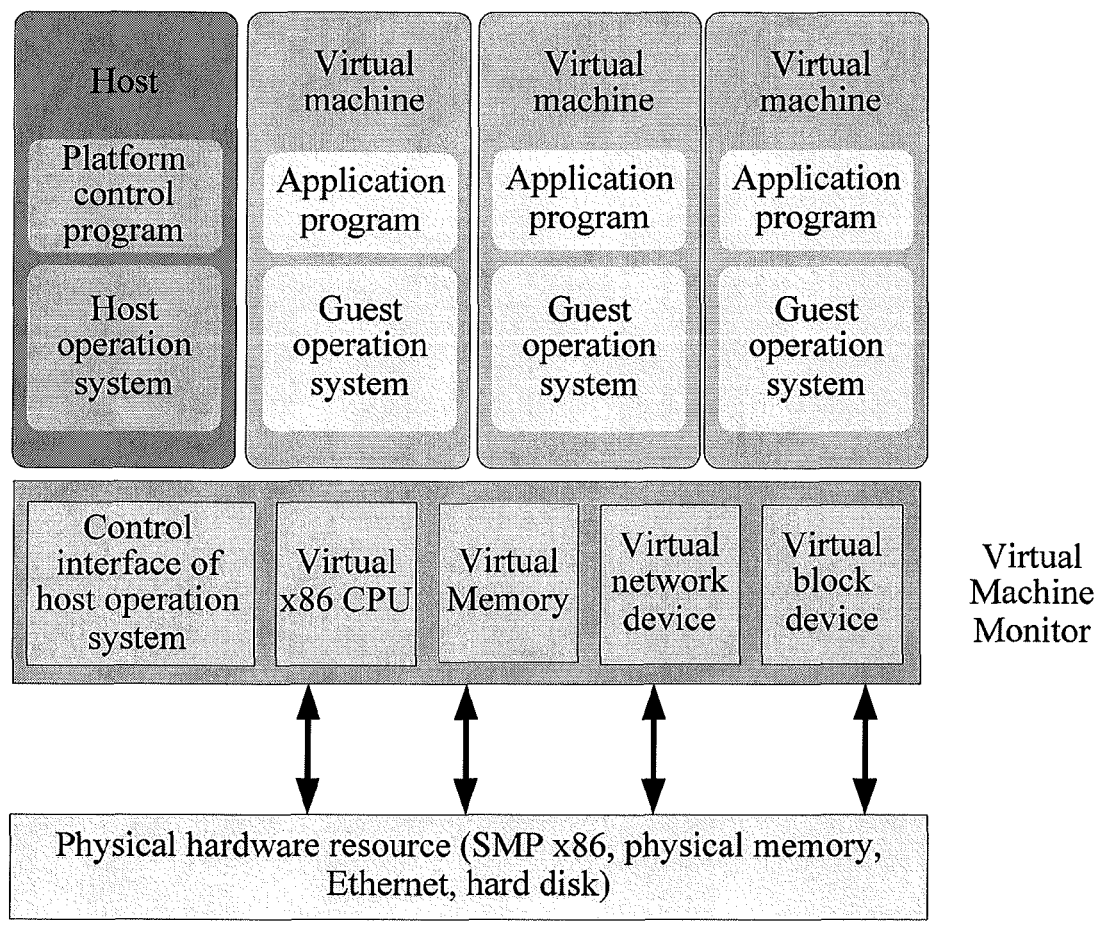
FIG. 1 is a schematic diagram of a logic structure of a virtual trusted platform involved in an embodiment of the present invention.

FIG. 1 is a schematic diagram of a logic structure of a virtual platform architecture involved in an embodiment of the present invention. As shown in FIG. 1, the virtual platform architecture includes a physical hardware resource layer (which may be considered as a physical layer), a lightweight virtualization management program layer (which is generally called as a Hypervisor or as a virtual machine monitor layer, and may considered as a virtual layer) that runs above the physical layer, and a virtual machine layer that runs above the virtualization management program layer. Virtualization management programs schedule underlying physical resources by multiple ways, and support the top virtual machines. Virtual machines independent to each other in the virtual machine layer can run at the same time, and different operating systems and application programs may be installed in the virtual machines. Uniform scheduling management performed by the virtualization management program layer is required to enable the virtual machines to use physical layer resources, and an administrator administrates and controls platform configuration and other virtual machines through a virtual host machine. It should be noted that, as for a virtual trusted platform, a trusted computing technology is introduced into a virtual platform, a TPM is configured in underlying of the virtual platform, and the TPM is virtualized through management programs in the virtual platform, so as to create different TPM examples, and provide trusted computing services for different virtual machines.

Virtual machine migration indicates that virtual machines running on a physical platform or a virtual platform need to run on another platform due to, for example, load balancing, hardware failure or security reasons, which involves the migration of a virtual machine from a source host platform to a target host platform. The security in the virtual machine migration includes the security of the virtual machine after migration to the target host platform and the security of the target platform after the accepting (or supporting) of the virtual machine.

According to an embodiment of the present invention, not only a source host platform (referred to as source platform) of the virtual machine to be migrated and a target host platform (referred to as target platform) of the virtual machine to be migrated, but also the virtual machine to be migrated is checked and evaluated, and a decision-making result of whether to permit the virtual machine to be migrated is obtained according to an evaluation result of the source platform, an evaluation result of the target platform, and an evaluation result of the virtual machine to be migrated, thereby not only the security of the virtual machine after migration to the target platform (that is, the normal operation of the virtual machine is not influenced after migration to the target platform is ensured), but also the security of the target platform after the accepting (or supporting) of the virtual machine is ensured (that is, it is ensured the security status or normal operation of the target platform is not influenced or threatened after migration of the virtual machine).

Hereinafter, the embodiments of the present invention are described in detail with reference to the accompanying drawings.

Figure 2:
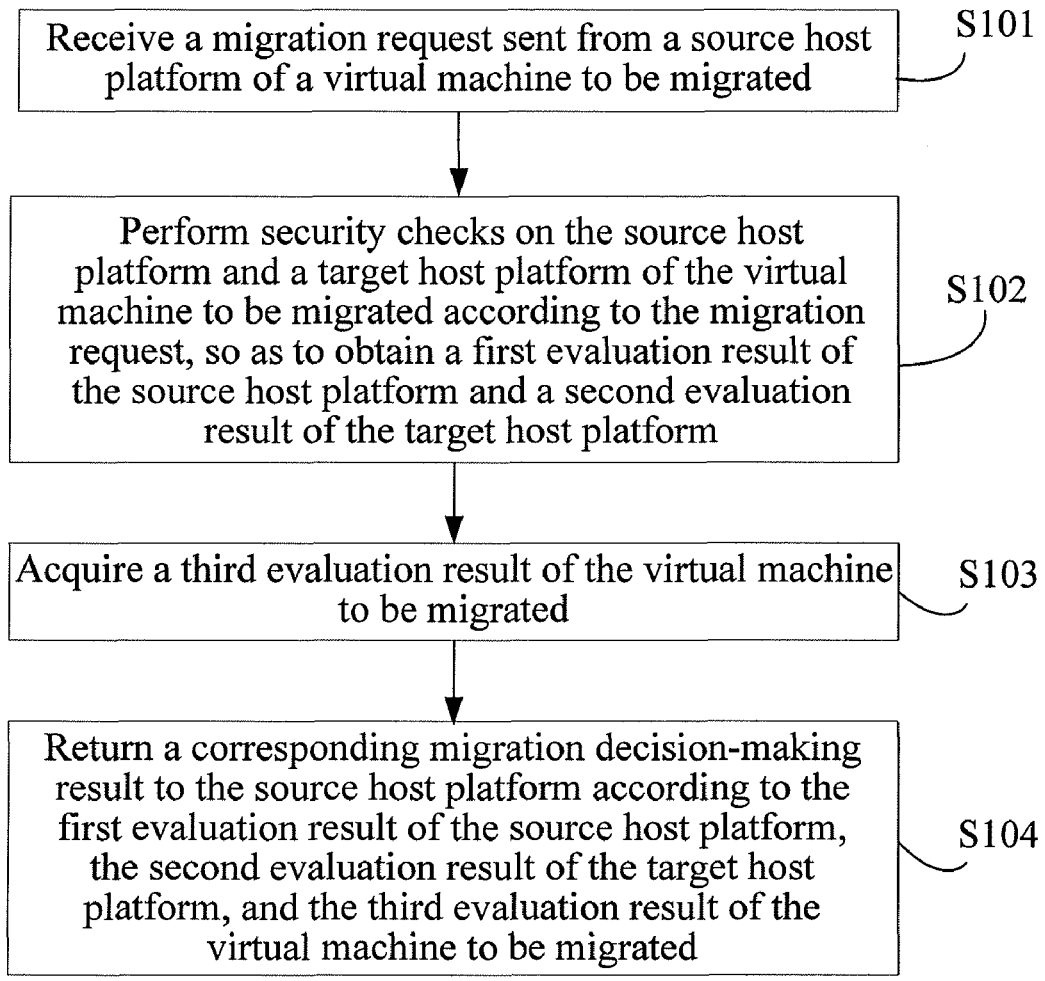
FIG. 2 is a schematic flow chart of a method for making a decision about virtual machine migration according to an embodiment of the present invention.

FIG. 2 is a schematic flow chart of a method for making a decision about virtual machine migration according to an embodiment of the present invention, which is applicable to an apparatus for making a decision about virtual machine migration in a system architecture based on a virtual trusted platform. A migration decision-making entity here, may be, but not limited to, a source platform on which a virtual machine to be migrated locates, a target platform of the virtual machine to be migrated, or a device of an MA acting as a trusted third party in a virtual machine migration process. The method may include the following steps:

Step S101: Receive a migration request sent from a source host platform (referred to as source platform in this embodiment) of a virtual machine to be migrated.

Specifically, the migration request carries evaluation requirements from the source host platform (optionally, and the virtual machine to be migrated) for a target host platform of the virtual machine to be migrated.

Step S102: Perform security checks on the source host platform of the virtual machine to be migrated and the target host platform (referred to as target platform in this embodiment) of the virtual machine to be migrated according to the migration request, to obtain a first evaluation result of the source platform and a second evaluation result of the target platform.

Step S103: Acquire a third evaluation result of the virtual machine to be migrated.

Specifically, when the evaluation results of the source platform and the target platform indicate that they both pass the evaluations, a third evaluation result of the virtual machine to be migrated is acquired; however, the present invention includes, but is not limited to this case.

Step S104: Return a corresponding migration decision-making result to the source platform according to the first evaluation result of the source platform, the second evaluation result of the target platform, and the third evaluation result of the virtual machine to be migrated.

Specifically, the corresponding migration decision-making result is returned to the source platform according to the first evaluation result of the source platform, the second evaluation result of the target platform, the third evaluation result of the virtual machine to be migrated, and a migration strategy. Optionally, the corresponding migration decision-making result may be further returned to the target platform.

The migration strategy may be that: if the first evaluation result of the source platform, the second evaluation result of the target platform, and a status information evaluation result and an integrity validation result of the virtual machine to be migrated all indicate that evaluation is passed, the virtual machine is permitted to be migrated; if the first evaluation result of the source platform, the second evaluation result of the target platform, and a status information evaluation result and an integrity validation result of the virtual machine to be migrated not all indicate that evaluation is passed, the virtual machine is not permitted to be migrated.

In an implementation, acquiring the third evaluation result of the virtual machine to be migrated in step S103 includes the following step:

Evaluate status information of the virtual machine to be migrated, to obtain a status information evaluation result; and/or, perform integrity validation on the virtual machine to be migrated on the source platform, to obtain a first integrity validation result of the virtual machine to be migrated.

Alternatively, in another implementation, acquiring the third evaluation result of the virtual machine to be migrated in step S103 includes the following step:

Receive a status information evaluation result of the virtual machine to be migrated and/or a first integrity validation result of the virtual machine to be migrated sent from the target platform or the source platform.

Alternatively, in another implementation, acquiring the third evaluation result of the virtual machine to be migrated in step S103 includes the following steps:

Evaluate status information of the virtual machine to be migrated, to obtain a status information evaluation result; and receive a first integrity validation result of the virtual machine to be migrated sent from the source platform or the target platform.

Alternatively, in another implementation, acquiring the third evaluation result of the virtual machine to be migrated in step S103 includes the following steps:

Receive a status information evaluation result of the virtual machine to be migrated sent from the source platform or the target platform; and perform integrity validation on the virtual machine to be migrated on the source platform, to obtain a first integrity validation result of the virtual machine to be migrated.

Correspondingly, step S104 specifically includes: making a corresponding decision according to the first evaluation result of the source platform, the second evaluation result of the target platform, and the status information evaluation result and/or the first integrity validation result of the virtual machine to be migrated, and returning a corresponding migration decision-making result to the source platform. Specifically, if the first evaluation result of the source platform, the second evaluation result of the target platform, and the status information evaluation result and/or the first integrity validation result of the virtual machine to be migrated all indicate that evaluation is passed, a decision-making result that the virtual machine is permitted to be migrated is obtained; if the first evaluation result of the source platform, the second evaluation result of the target platform, and the status information evaluation result and/or the first integrity validation result of the virtual machine to be migrated not all indicate that evaluation is passed, a decision-making result that the virtual machine is not permitted to be migrated is obtained; and a corresponding migration decision-making result is returned to the source platform.

The evaluating the status information of the virtual machine to be migrated to obtain the status information evaluation result may be specifically: evaluating the status information of the virtual machine to be migrated according to evaluation requirements from the target platform for the virtual machine to be migrated, to obtain the status information evaluation result.

In an implementation mode, the evaluating the status information of the virtual machine to be migrated according to the evaluation requirements from the target platform for the virtual machine to be migrated may specifically include the following steps:

Receive an evaluation request sent from the target platform, in which the evaluation request carries evaluation requirements from the target platform for the virtual machine to be migrated, and the evaluation requirements include mandatory evaluation attributes including owner of the virtual machine, use of the virtual machine, and relevant information of historical host platforms of the virtual machine. Alternatively, the evaluation requirements include mandatory evaluation attributes including owner of the virtual machine, use of the virtual machine and relevant information of historical host platforms of the virtual machine; and additional evaluation attributes including one or more of the following attributes: requirements for a virtual device of the virtual machine and for the use of physical hardware resources of the virtual machine, detailed information of operating systems used and main application programs that run on the virtual machine, time logs of the virtual machine, and internal security strategy of the virtual machine.

Acquire information of attributes to be evaluated from the virtual machine to be migrated and the source host platform of the virtual machine according to the evaluation requirements carried in the evaluation request.

Obtain a status information evaluation result according to a result obtained by comparing the acquired information of attributes to be evaluated and a corresponding evaluation standard. A specific process may include the following steps:

Determine whether the owner of the virtual machine to be migrated and an owner of a virtual machine that runs on the target platform belong to the same owner group, and if yes, the evaluation for the mandatory evaluation attribute is passed (that is, the evaluation for the essential options is passed); if no, the evaluation for the essential options is not passed.

Match tasks that are performed by the virtual machine to be migrated with types of tasks supported by the target platform, where the tasks that are performed by the virtual machine to be migrated are acquired from the source platform or the virtual machine to be migrated. If the tasks that are performed by the virtual machine match the types of tasks supported by the target platform, the evaluation for the mandatory evaluation attributes is passed; if the tasks that are performed by the virtual machine do not match the types of tasks supported by the target platform, the evaluation for the mandatory evaluation attributes is not passed.

Match relevant information of a first historical host platform of the virtual machine to be migrated with time logs of security events stored in an MA, where the relevant information of the first historical host platform is acquired from the source platform. If there is no security event occurred or the security level of an occurred security event is in the scope of security event level of the target platform when the virtual machine to be migrated runs on each historical host platform, the evaluation for the mandatory evaluation attributes is passed; if there is a security event occurred or the security level of an occurred security event is not in the scope of security event level of the target platform, the evaluation for the mandatory evaluation attributes is not passed.

If the evaluations for the mandatory evaluation attributes are all passed, the status information evaluation is passed; if the evaluations are not all passed, the status information evaluation is not passed.

The performing integrity validation on the virtual machine to be migrated on the source platform specifically includes the following steps:

Acquire a first extension value and measurement information of the virtual machine to be migrated.

Calculate a second extension value according to the measurement information, and obtain a first integrity validation result of the virtual machine to be migrated according to a result obtained by comparing the second extension value and the first extension value and a result obtained by comparing the measurement information and an acquired standard value.

In addition, in order to implement the iterative integrity validation, after the performing integrity validation on the virtual machine to be migrated on the source platform, the method further including the following step:

Perform integrity validation on the source host platform, to obtain a second integrity validation result of the source host platform.

Correspondingly, step S104 is specifically returning a corresponding migration decision-making result to the source platform (optionally, and the target platform) according to the first evaluation result of the source platform, the second evaluation result of the target platform, the status information evaluation result and/or the first integrity validation result of the virtual machine to be migrated, and the second integrity validation result. Specifically, if the first evaluation result of the source platform, the second evaluation result of the target platform, the status information evaluation result and/or the first integrity validation result of the virtual machine to be migrated, and the second integrity validation result all indicate that evaluation is passed, a decision-making result that the virtual machine is permitted to be migrated is obtained, if the first evaluation result of the source platform, the second evaluation result of the target platform, the status information evaluation result and/or the first integrity validation result of the virtual machine to be migrated, and the second integrity validation result not all indicate that evaluation is passed, a decision-making result that the virtual machine is not permitted to be migrated is obtained; and a corresponding migration decision-making result is returned to the source platform (optionally, and the target platform).

According to the embodiment of the present invention, it can be seen that based on the security checks on the source platform and the target platform, a process of evaluating the status information of the virtual machine to be migrated and/or performing integrity validation on the virtual machine to be migrated is further included according to the evaluation requirements from the target platform for the virtual machine to be migrated, and the decision-making result of whether to permit the virtual machine to be migrated to the target platform is made and returned according to the first evaluation result of the source platform, the second evaluation result of the target platform, and the corresponding status information evaluation result and/or the first integrity validation result of the virtual machine to be migrated. That is, after the bases of making a decision about whether to permit the virtual machine to be migrated are taken into full consideration, the migration is permitted on the basis of meeting the evaluation requirements of the target platform, while the completeness of the decision-making bases is reinforced, thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

Figure 3:
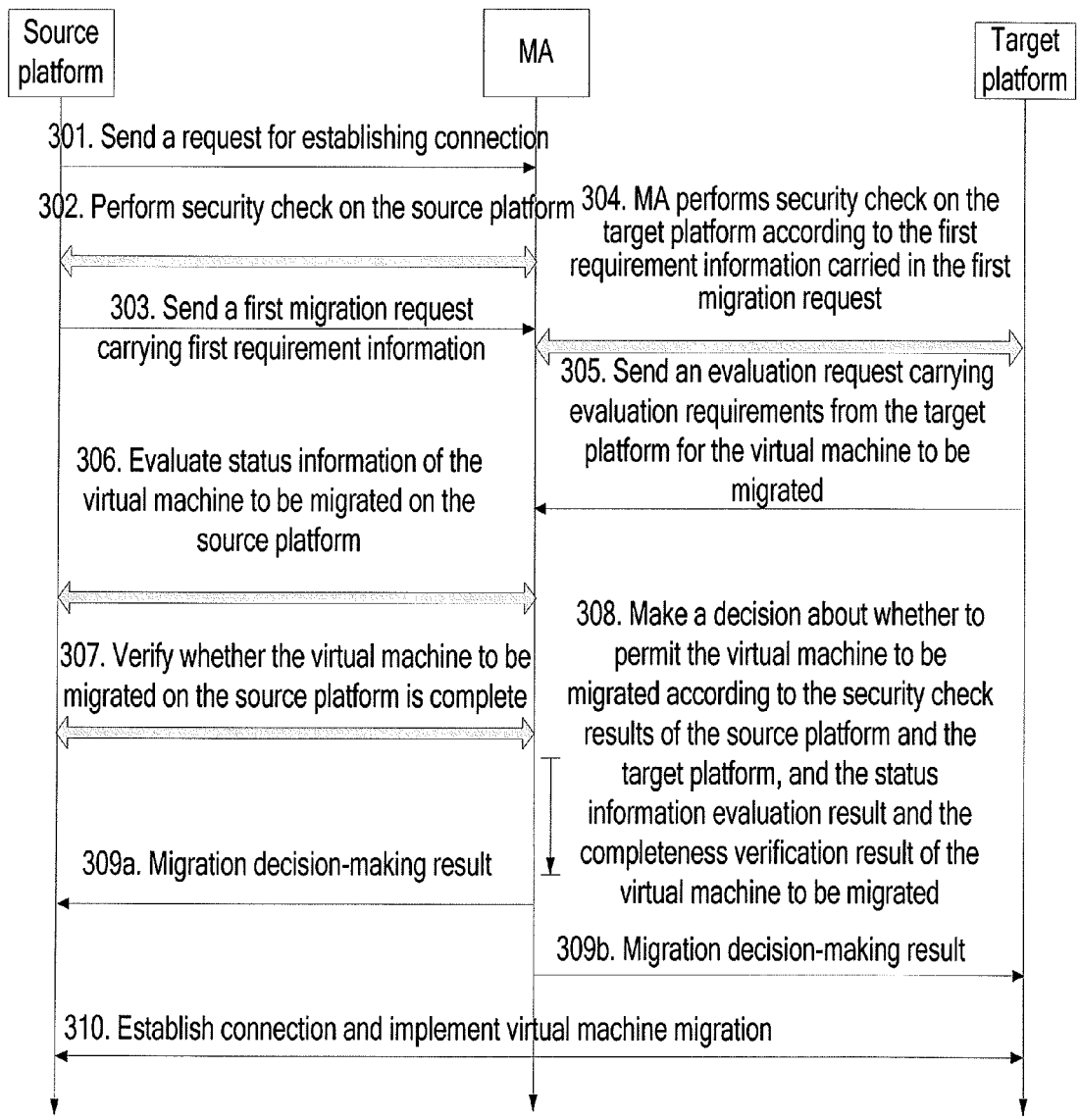
FIG. 3 is a schematic interaction diagram of a method for making a decision about virtual machine migration according to an embodiment of the present invention.

FIG. 3 is a schematic interaction diagram of a method for making a decision about virtual machine migration according to an embodiment of the present invention. As shown in FIG. 3, in the embodiment of the present invention, evaluations for a virtual machine are performed by an MA, including status information evaluation and integrity validation of the virtual machine. The method may include the following steps:

Step S301: A source platform sends a request message for establishing connection to the MA, in which the request message for establishing connection carries a connection establishment objective, that is, a migration request of a virtual machine on the source virtual platform.

Step S302: The MA performs security check on the source platform, for example, ID validity check on the source platform or integrity validation of the source platform, to obtain a security check result of the source platform (for example, an ID validity check result, or an integrity validation result). Optionally, the source platform may further perform check on the MA (mainly perform check against ID validity of the MA). If the check on the source platform or the checks on the source platform and the MA are passed, step S303 is performed; and if no, the migration is not permitted, the implementation is stopped and the process is ended.

Step S303: The source platform sends a first migration request to the MA, in which the first migration request carries first requirement information for a target platform by a virtual machine to be migrated, and the first requirement information may include attribute requirements for the target platform by the source platform, and optionally may further include an identifier of the target platform.

It should be noted that the first migration request herein may carry different specific content of the first requirement information depending on different application scenarios. For example, in a practical scenario, when the source platform transmits the first migration request, if the target platform of the virtual machine to be migrated and the attribute requirements for the target platform are determined, the migration request carries the attribute requirements for the target platform by the source platform and the identifier of the target platform; and if the attribute requirements for the target platform are determined, but there is no specific target platform, in this scenario, the MA needs to select a suitable target platform for the virtual machine to be migrated according to relevant strategies for the source platform and in the whole system architecture.

Step S304: The MA performs security check on the target platform according to the first requirement information carried in the first migration request. A specific process may include: performing attribute match check on the target platform, and/or performing integrity validation on the target platform (that is, integrity validation), to obtain a security check result of the target platform (for example, an attribute match check result and/or an integrity validation result). If the attribute match check is passed, the integrity validation on the target platform is performed; and if no, the migration is not permitted, and the implementation is stopped. If the integrity validation is passed, step S305 is performed; if the integrity validation is not passed, the migration is not permitted, and the implementation is stopped; and optionally, a reason why the migration is not permitted may be sent to the source platform.

Step S305: The target platform sends an evaluation request to the MA, in which the evaluation request carries evaluation requirements from the target platform for the virtual machine to be migrated, and the evaluation requirements include mandatory evaluation attributes including owner of the virtual machine (which means a user controlling the virtual machine), use of the virtual machine, and relevant information of historical host platforms of the virtual machine including host history of the virtual machine (that is, all virtual platforms which host the virtual machine in the persistent migration process from the creation of the virtual machine to the present) and time logs on each host platform mainly involving immigration and emigration time.

According to local requirements, status, and configurations, the target platform may further optionally include one or more of additional evaluation attributes such as requirements for a virtual device of the virtual machine (for example, number of virtual CPUs and virtual memory capacity) and the use of physical hardware resources of the virtual machine; detailed information of operating systems used and main application programs that run on the virtual machine; time logs of the virtual machine, including life cycle, creation time, sleep time, boot time and logout time of the virtual machine; or security strategy in the virtual machine, for example, an access control used by the virtual machine of either a discretionary access control strategy or a mandatory access control strategy (if the latter, setting bases and manners of security label and security level are specifically included), security model used in virtual machine security assurance, and key points in security assurance (integrity, confidentiality, or both that need to be assured).

The local status and configuration strategy of the target platform are previous settings for the target platform by an owner of the platform or a system administrator, for example, if a previously defined target platform needs to have a higher auditability, the evaluation requirements should include detailed log information of the virtual machine (including not only host-history log information of the virtual machine, but also life-cycle time log of the virtual machine); if a virtual machine supported by the target platform has a feature of high dynamic change, the evaluation requirements for the virtual machine to be migrated should include checks on usages of the virtual devices and the physical resources by the virtual machine.

It should be further noted that while the target platform advances the evaluation requirements according to the local status and configuration strategies, standards achieving these requirements need to be defined, and the standard are quantifiable as possible, for example, maximal memory capacity that can be provided by the target platform at present, and a kernel version of operating system Linux operating in the virtual machine of at least 2.6 or later; and that though the evaluation requirements from the target platform are changed according to the difference of the local demands of the target platform, the evaluation requirements need to be essential evaluation options in status information evaluation once being advanced by the target platform.

Figure 4:
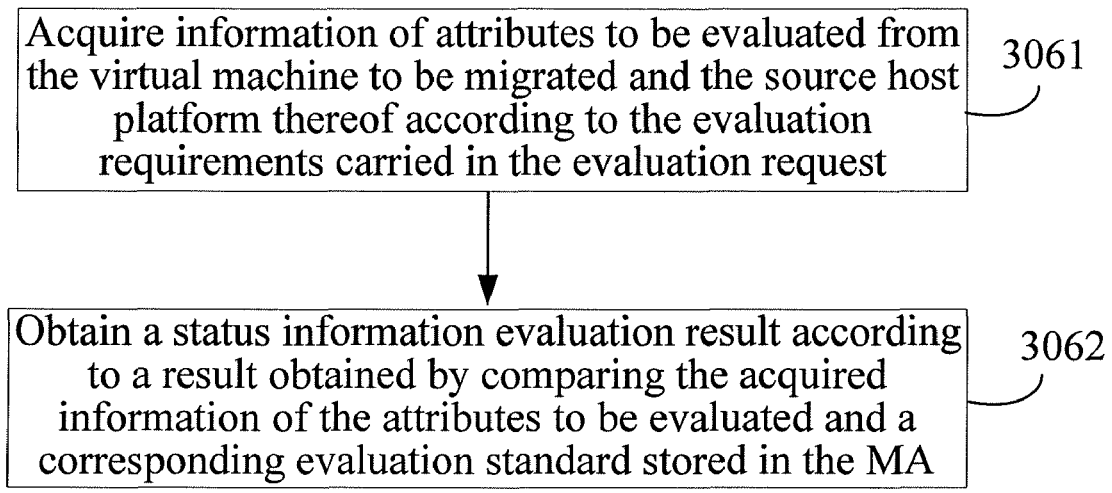
FIG. 4 is a schematic flow chart of step S306 in FIG. 3.

Step S306: The MA evaluates status information of the virtual machine to be migrated, to obtain a status information evaluation result of the virtual machine to be migrated. An evaluation process in step S306 is as shown in FIG. 4, and may include the following steps:

Step 3061: The MA acquires information of attributes to be evaluated from the virtual machine to be migrated and the source host platform thereof according to the evaluation requirements carried in the evaluation request, in which the information of the attributes to be evaluated includes at least mandatory evaluation attributes.

Step 3062: Obtain a status information evaluation result according to a result obtained by comparing the acquired information of the attributes to be evaluated and a corresponding evaluation standard stored in the MA.

Specifically, according to the evaluation standard in the MA, evaluation is started with a mandatory evaluation attribute, and only evaluations for the mandatory evaluation attributes are all passed, the status information evaluation is passed; if evaluations for the mandatory evaluation attributes are not all passed, the status information evaluation is not passed. If the status information evaluation is passed, or passed after waiting or being specifically processed, step S307 is performed; if no, the migration is not permitted, and the implementation is stopped; and optionally, a reason why the migration is not permitted may be returned or not returned.

Hereinafter, descriptions are made with reference to the mandatory evaluation attributes one by one.

(1) The owner of the virtual machine to be migrated and an owner of a virtual machine that runs on the target platform are compared, to check whether they belong to entities having conflict benefits. A specific process may include the following steps:

Step 1.1: A system administrator sorts owners of virtual machines in advance, so as to divide different types of owner into different groups, in which a sorting principle is that these owners belong to different entities having conflict benefits, and the MA also stores the sorting information.

Step 1.2: In the evaluation process, the MA obtains first owner information of the virtual machine to be migrated from the source platform, and obtains second owner information of the virtual machine that runs on the target platform therefrom.

Step 1.3: Determined whether an owner group that the first owner information belongs to and an owner group that the second owner information belongs to are the same owner group, if they belong to the same own group, determine that the evaluation for this mandatory evaluation attribute of the owner of the virtual machine is passed; and if they belong to different owner groups, determine that the evaluation for this mandatory evaluation attribute is not passed.

(2) Use of the virtual machine to be migrated is checked, so as to determine whether the use is consistent with types of task supported by the target platform.

A specific process includes the following steps:

Step 2.1: A system administrator defines types of tasks supported by virtual platforms in an administration scope thereof, and sorts the virtual platforms according to these types defined. Support function types of the virtual platforms are stored in the MA.

Step 2.2: In the evaluation process, the MA acquires tasks performed by the virtual machine to be migrated from the source platform or the virtual machine to be migrated, and locally acquires types of task supported by a virtual platform as the virtual platform from the MA.

Step 2.3: Determined whether they are matched. If yes, the evaluation for mandatory evaluation attribute regarding the use of the virtual machine is passed; and if no, the evaluation for the mandatory evaluation attribute is not passed.

(3) It is checked whether the relevant information of the historical host platforms of the virtual machine to be migrated meets corresponding requirements by the target platform. A specific process includes the following steps:

Step 3.1: The MA stores time logs of security events of virtual platforms in an administration scope of a system administrator and logs of event analysis abstracts, and strategies configured in the MA define security levels of the security events and tolerant security event levels of different virtual platforms.

Step 3.2: The MA acquires relevant information of a first historical host platform of the virtual machine to be migrated from the source platform, including historical platforms that host the virtual machine to be migrated and time information on different platform.

Step 3.3: Match the relevant information of the first historical host platform with the time logs of the security events stored in the MA, so as to determine whether there is a security event occurred when the virtual machine to be migrated is running on each historical host platform.

If there is no security event occurred on all host platforms, the evaluation for this mandatory evaluation attribute is passed; and if there is a security event occurred when the virtual machine to be migrated is running on a certain historical platform, a security level of the security event is further determined, and compared with a tolerant security event level of the target platform, if the security level of the security event is in a scope of the tolerant security level of the security event of the target platform, the evaluation for the mandatory evaluation attribute is passed; if the security level of the security event is not in a scope of the tolerant security level of the security event of the target platform, the evaluation for the mandatory evaluation attribute is not passed.

Optionally, if the evaluation request sent from the target platform includes the additional evaluation attributes, one or more of the following is further included.

(4) The virtual-device requirements and the use requirements for the physical resources of the virtual machine are evaluated, and a specific process includes the following steps:

Compare the acquired virtual-device requirements and use requirements for the physical resources of the virtual machine with virtual-device requirements and use requirements for the physical resources which can be provided by the target platform, if the target platform temporarily cannot meet "the virtual-device requirements of the virtual machine and the use requirements for the physical resources by the virtual machine" (for example, the target platform currently cannot meet a memory requirement of the virtual machine to be migrated because too much memory is occupied due to lots of programs that run thereon), the MA returns a response message to the source host platform of the virtual machine, so as to notify the virtual machine of postponing the migration or requesting migration again after the source host platform changes the configuration.

(5) Operation system, main application programs and time logs loaded in the virtual machine are evaluated, if the operating system, the main application programs and the time logs loaded in the virtual machine and acquired by the MA do not meet evaluation contents required by the target platform (for example, kernel version of the operating system of the virtual machine to be migrated is not matched with the requirement of the target platform), a response message is returned to the source platform and the virtual machine to be migrated, for requiring the supplementation of complete information needed.

Step S307: The MA performs integrity validation on the virtual machine to be migrated on the source platform, to obtain an integrity validation result of the virtual machine, and a specific process includes the following steps:

Step (1): The MA acquires data information of the virtual machine to be migrated in two aspects: Hash extension computing results of firmware and software booted inside the virtual machine that are saved in a trusted chip (for example, TPM); and measurement log information (for example, name, release, and time) of firmware and members booted inside the virtual machine from turning on to a current status.

In general, the above two are encrypted with a key of the trusted chip, that is, an encryption key certificate is further needed to be acquired from the virtual machine to be migrated.

Step (2): The MA recalculates Hash extension values of these software and firmware according to the measurement log information, and compares the Hash extension values acquired through recalculation with the Hash extension computing results acquired from the virtual machine to be migrated. If they are identical, it is determined that the virtual machine to be migrated faithfully records programs running thereon.

Step (3): In addition, the MA compares the relevant data information saved in the measurement log information with a standard value saved in the MA (or a standard value acquired by the MA). If they are identical, it can be determined that the virtual machine to be migrated is a trusted system platform, that is, an integrity validation result is obtained, which indicates that the integrity validation of the virtual machine to be migrated is passed.

It should be noted that in an implementation, the MA saves a particular database, in which the particular database stores the Hash computing results of the programs running on the virtual machine to be migrated, and data information of the particular database is publicized in the industry (and thus, is called as standard value); and in another implementation, the MA accesses a particular website through an URL to acquire the standard value.

Step S308: The MA makes a decision about whether to permit the virtual machine to be migrated according to the security check result of the source platform, the security check result of the target platform, and the status information evaluation result of the virtual machine to be migrated and the integrity validation result of the virtual machine to be migrated.

The bases of making a decision about whether to permit the virtual machine to be migrated include the ID validity check result, and as required, the integrity validation result of the source platform; the attribute match check result and/or as desired, the integrity validation result of the target platform; and the status information evaluation result of the virtual machine, and the integrity validation result of the virtual machine.

Step S309: The MA sends a corresponding migration decision-making result respectively to the source platform and the target platform.

Step a): The decision-making result of whether to permit the virtual machine to be migrated is sent to the source platform, and if the migration is permitted, step S310 is performed; if the migration is not permitted, the implementation is stopped, and optionally, a reason why the migration is not permitted is returned.

Step b): The decision-making result of whether to permit the virtual machine to be migrated is sent to the target platform, and if the migration is permitted, step S310 is performed; and if the migration is not permitted, the implementation is stopped, and optionally, a reason why the migration is not permitted is returned. It should be noted that only for easy of description herein, the order of steps a) and b) may be arbitrary, and step b) is optional.

Step S310: Establish a connection between the source platform and the target platform, so as to implement the specific migration. It should be noted that the virtual machine migration includes, for example, migration of the virtual machine memory information, and migration of the virtual machine physical storage information, that is, it is needed to be ensured that the virtual machine migration is apparent for top application programs, in other words, it is required that an underlying platform on which the virtual machine is running is changed with no or little influence as possible to the normal operations of the top application programs, which is within the prior art, and is not described in detail herein again. It should be noted that the order of steps S306 and S307 may be arbitrary. In addition, the security check result of the source platform in step S302 may be considered as the first evaluation result of the source platform, and preferably, the security check result of the source platform does not include the integrity validation result of the source platform. The security check result of the target platform in step S304 may be considered as the second evaluation result of the target platform.

To sum up, in the embodiment of the present invention, based on the security checks on the source platform and the target platform, a process of evaluating the status information of the virtual machine to be migrated and performing integrity validation on the virtual machine to be migrated is further included, and the decision-making result of whether to permit the virtual machine to be migrated to the target platform is made according to the security check results of the source platform and the target platform, and the status information evaluation result and the integrity validation result of the virtual machine to be migrated. That is, the migration is permitted on the basis of meeting the evaluation requirements from the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

Further, different feedback messages such as not permitting migration, suspension of migration, and requesting for migration after information supplementation are returned for the evaluation results for different evaluation contents, so as to prevent the arrogance in decision making, and improve the flexibility of the migration request and the decision making, so that the decision-making result is more complete, which can facilitate the effective implementation of the virtual machine migration.

Moreover, the integrity validation of the virtual machine to be migrated is included, to ensure the trusted attributes in the virtual machine migration.

Figure 5:
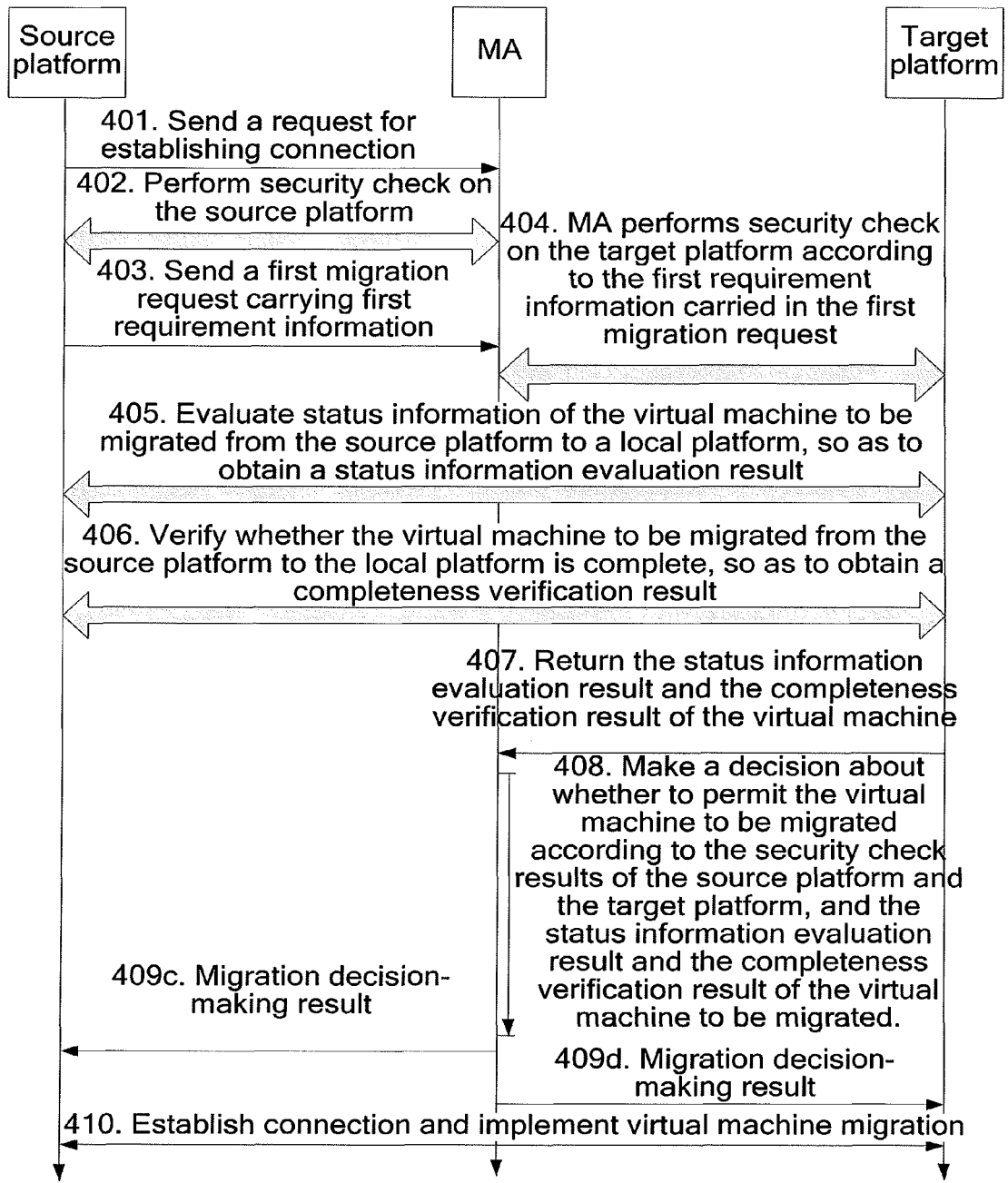
FIG. 5 is a schematic interaction diagram of a method for making a decision about virtual machine migration according to an embodiment of the present invention.

FIG. 5 is a schematic interaction diagram of another method for making a decision about virtual machine migration according to an embodiment of the present invention. As shown in FIG. 5, in an embodiment of the present invention, evaluations for a virtual machine are performed by a target platform, including status information evaluation and integrity validation of the virtual machine. It should be noted that the status information may be performed by aid of an MA, and the integrity validation is performed by the target platform. The method may include the following steps:

Step S401: A source platform sends a request message for establishing connection to the MA, in which the request message for establishing connection carries a connection establishment objective, that is, a migration request of a virtual machine on the source virtual platform.

Step S402: The MA performs security check on the source platform, for example, ID validity check on the source platform, or integrity validation of the source platform, to obtain a security check result of the source platform (for example, an ID validity check result, or an integrity validation result). Optionally, the source platform may further perform check on the MA (mainly perform check against ID validity of the MA). If the check on the source platform, or the checks on the source platform and the MA are passed, step S403 is performed; and if no, the migration is not permitted, the implementation is stopped and the process is ended.

Step S403: The source platform sends a first migration request to the MA, in which the first migration request carries first requirement information for a target platform by a virtual machine to be migrated, and the first requirement information may include attribute requirements for the target platform by the source platform, and optionally may further include an identifier of the target platform.

Step S404: The MA performs security check on the target platform according to the first requirement information carried in the first migration request. A specific process may include: performing attribute match check on the target platform, and/or performing integrity validation on the target platform (that is, integrity validation), to obtain a security check result of the target platform (for example, an attribute match check result and/or an integrity validation result). If the attribute match check is passed, the integrity validation on the target platform is performed; and if no, the migration is not permitted, and the implementation is stopped. If the integrity validation is passed, step S405 is performed; if the integrity validation is not passed, the migration is not permitted, and the implementation is stopped; and optionally, a reason why the migration is not permitted may be sent to the source platform.

Figure 6:
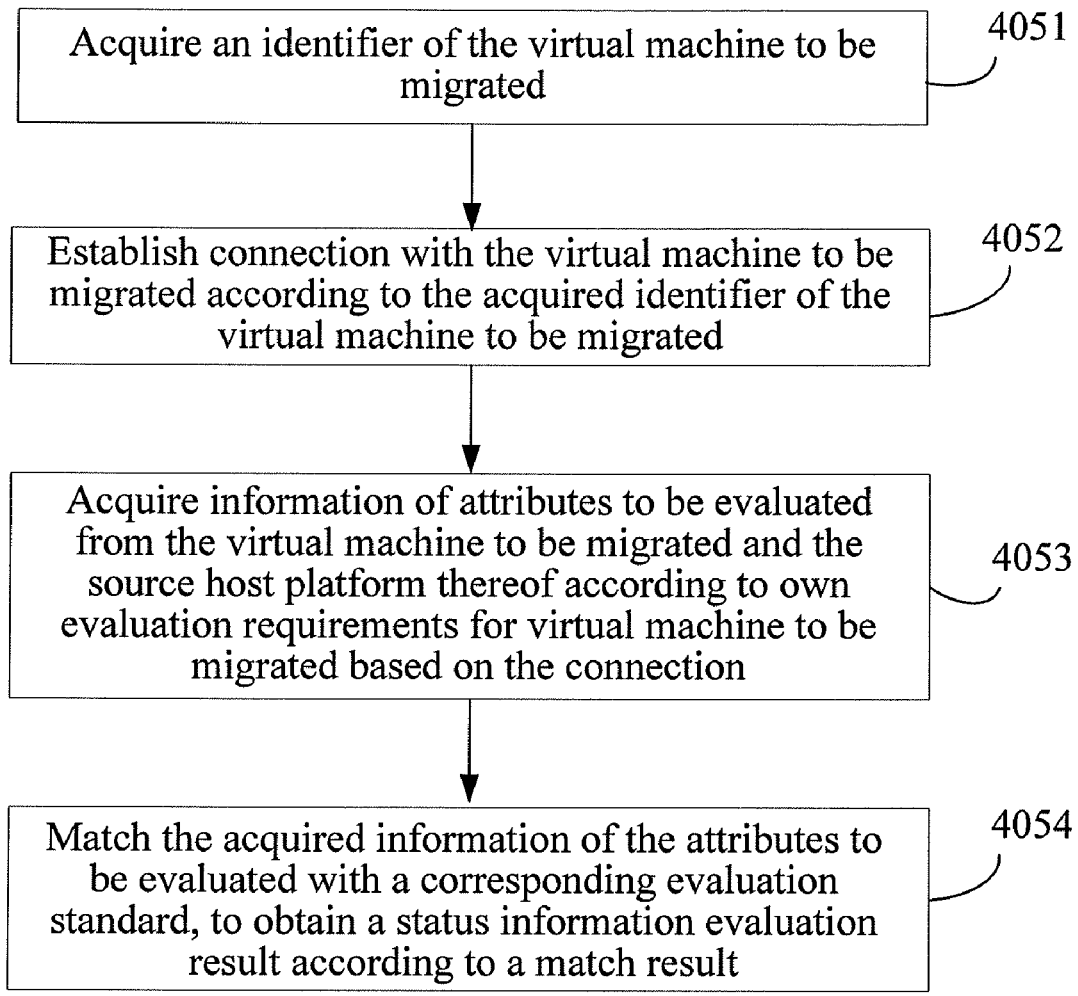
FIG. 6 is a schematic flow chart of step S405 in FIG. 5.

Step S405: The target platform evaluates status information of the virtual machine to be migrated from the source platform to a local platform, to obtain a status information evaluation result, and a specific process of step S405 is as shown in FIG. 6, and may include the following steps:

Step 4051: The target platform acquires an identifier of the virtual machine to be migrated, in which the identifier means a parameter enabling the target platform to establish connection with the virtual machine, such as, IP address of the virtual machine, and name of the virtual machine; and the target platform may acquire the identifier of the virtual machine to be migrated from the MA, or acquire the identifier of the virtual machine to be migrated from the source platform by directly establishing connection with the source platform.

Step 4052: The target platform establishes a connection with the virtual machine to be migrated according to the acquired identifier of the virtual machine to be migrated.

Step 4053: Based on this connection, the target platform acquires information of attributes to be evaluated from the virtual machine to be migrated and the source host platform of the virtual machine according to own evaluation requirements for virtual machine to be migrated, in which the evaluation requirements include mandatory evaluation attributes including owner of the virtual machine, use of the virtual machine, and relevant information of historical host platforms of the virtual machine including host history of the virtual machine and time logs on each host platform mainly involving immigration and emigration time; and optionally the evaluation requirements may further include one or more of the following additional evaluation attributes, such as requirements for a virtual device of the virtual machine and for the use of physical hardware resources of the virtual machine, detailed information of operating systems used and main application programs that run on the virtual machine, time logs of the virtual machine including life cycle, creation time, sleep time, boot time and logout time of the virtual machine, and internal security strategy of the virtual machine.

It should be noted that if connection is established between the target platform and the virtual machine to be migrated in advance, steps 4051 to 4052 can be skipped.

Step 4054: Match the acquired information of the attributes to be evaluated with a corresponding evaluation standard saved in the target platform, to obtain a status information evaluation result according to a match result (and optionally, security strategy). If the status information evaluation is passed, or passed after waiting or being specifically processed, step S406 is passed; if no, the migration is not permitted, and the implementation is stopped; and optionally, a reason why the migration is not permitted may be returned or not returned.

Herein, the safety strategy is that, as for the mandatory evaluation attributes of the evaluation requirements, only the evaluations for the mandatory evaluation attributes are all passed, the status information evaluation is passed; if evaluations for the mandatory evaluation attributes are not all passed, the status information evaluation is not passed.

Step S406: The target platform performs integrity validation on the virtual machine to be migrated on the source platform, to obtain an integrity validation result of the virtual machine to be migrated; and a specific process may be made reference to step S307.

The objects of the integrity validation are software, firmware, operating system, and application programs that run on the virtual machine.

Step S407: The target platform returns the status information evaluation result and the integrity validation result of the virtual machine to the MA.

Step S408: The MA makes a decision about whether to permit the virtual machine to be migrated according to the security check result of the source platform, the security check result of the target platform, and the status information evaluation result and the integrity validation result of the virtual machine to be migrated.

Step S409 The MA sends a corresponding migration decision-making result respectively to the source platform and the target platform.

Step c): Send the decision-making result of whether to permit the migration to the source platform. If the migration is permitted, step S410 is performed; and if the migration is not permitted, the implementation is stopped, and optionally, a reason why the migration is not permitted is returned.

Step d): Send the decision-making result of whether to permit the migration to the target platform. If the migration is permitted, step S410 is performed; if the migration is not permitted, the implementation is stopped, and optionally, a reason why the migration is not permitted is returned. It should be noted that only for easy of description herein, the order of steps c) and d) may be arbitrary, and step d) is optional.

Step S410: Establish a connection between the source platform and the target platform, so as to implement the specific migration, which is within the prior art, and thus is not described in detail herein again. It should be noted that the order of steps S405 and S406 may be arbitrary. Moreover, the security check result of the source platform in step S402 may be considered as a first evaluation result of the source platform, and preferably, the security check result of the source platform does not include the integrity validation result of the source platform. The security check result of the target platform in step S304 may be considered as a second evaluation result of the target platform.

To sum up, in the embodiment of the present invention, based on the security checks on the source platform and the target platform, a process of evaluating the status information of the virtual machine to be migrated and performing integrity validation on the virtual machine to be migrated is further included, and the decision-making result of whether to permit the virtual machine to be migrated to the target platform is made according to the security check results of the source platform and the target platform, and the status information evaluation result and the integrity validation result of the virtual machine to be migrated. That is, the migration is permitted on the basis of meeting the evaluation requirements from the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

Figure 7:
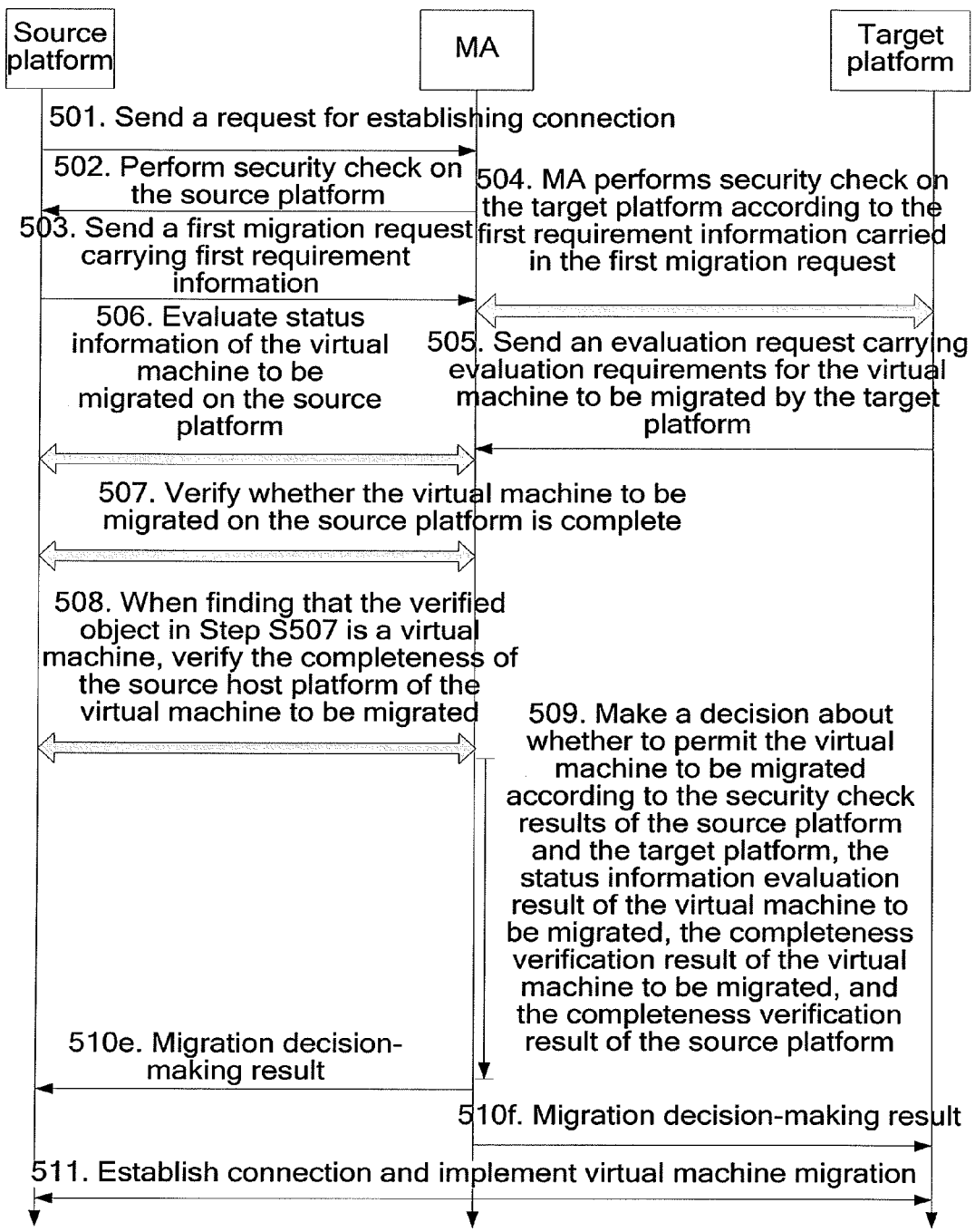
FIG. 7 is a schematic interaction diagram of a method for making a decision about virtual machine migration according to an embodiment of the present invention.

FIG. 7 is a schematic interaction diagram of another method for making a decision about virtual machine migration according to an embodiment of the present invention. As shown in FIG. 7, a virtual platform work group of a Trusted Computing Group (TCG) proposes an ideal of iterative integrity validation directed to integrity validation of a virtual machine in a virtual platform, that is, a remote challenger performs integrity validation on a virtual machine, and needs to perform integrity validation on a host platform of the virtual machine after finding that the object of integrity validation is a virtual machine. According to this ideal, in an embodiment of the present invention, integrity validations of the virtual machine and a source platform are completed together. This embodiment is directed to this application scenario, and status information evaluation and the integrity validation of the virtual machine are performed by an MA. The method may include the following steps.

Step S501: A source platform sends a request for establishing connection to the MA, in which the request for establishing connection carries a connection establishment objective, that is, a migration request of a virtual machine on the source virtual platform.

Step S502: The MA performs security check on the source platform, for example, ID validity check on the source platform, to obtain a security check result of the source platform (for example, an ID validity check result). Optionally, the source platform may further perform check on the MA (mainly perform check against ID validity of the MA). If the check on the source platform, or the checks on the source platform and the MA are passed, step S503 is performed; and if no, the migration is not permitted, the implementation is stopped and the process is ended. It should be noted that the integrity validation of the source platform is not performed in this step.

Step S503: The source platform sends a first migration request to the MA, in which the first migration request carries first requirement information for the target platform by a virtual machine to be migrated, and the first requirement information may include attribute requirements for the target platform by the source platform, and optionally may further include an identifier of the target platform.

Step S504: The MA performs security check on the target platform according to the first requirement information carried in the first migration request. A specific process may include: performing attribute match check and/or integrity validation on the target platform, to obtain a security check result of the target platform (for example, an attribute match check result and/or an integrity validation result). If the attribute match check is passed, the integrity validation on the target platform is performed; and if no, the migration is not permitted, and the implementation is stopped. If the integrity validation is passed, step S505 is performed; if the integrity validation is not passed, the migration is not permitted, and the implementation is stopped; and optionally, a reason why the migration is not permitted may be sent to the source platform.

Step S505: The target platform sends an evaluation request to the MA, in which the evaluation request carries evaluation requirements from the target platform for the virtual machine to be migrated, and the evaluation requirements include mandatory evaluation attributes, and optionally, may further include additional evaluation attributes. Details may be made reference to step S305.

Step S506: The MA evaluates status information of the virtual machine to be migrated, to obtain a status information evaluation result of the virtual machine to be migrated. Specifically, if the evaluations for the mandatory evaluation attributes are all passed, the status information evaluation is passed; if the evaluations are not all passed, the status information evaluation is not passed. If the status information evaluation is passed, or passed after waiting or being specifically processed, step S507 is performed; if no, the migration is not permitted, and the implementation is stopped; and optionally, a reason why the migration is not permitted may be returned or not returned. A specific process may be made reference to step S306.

Step S507: The MA performs integrity validation on the virtual machine to be migrated on the source platform, to obtain an integrity validation result of the virtual machine to be migrated, and a specific process may be made reference to step S307.

Figure 8:
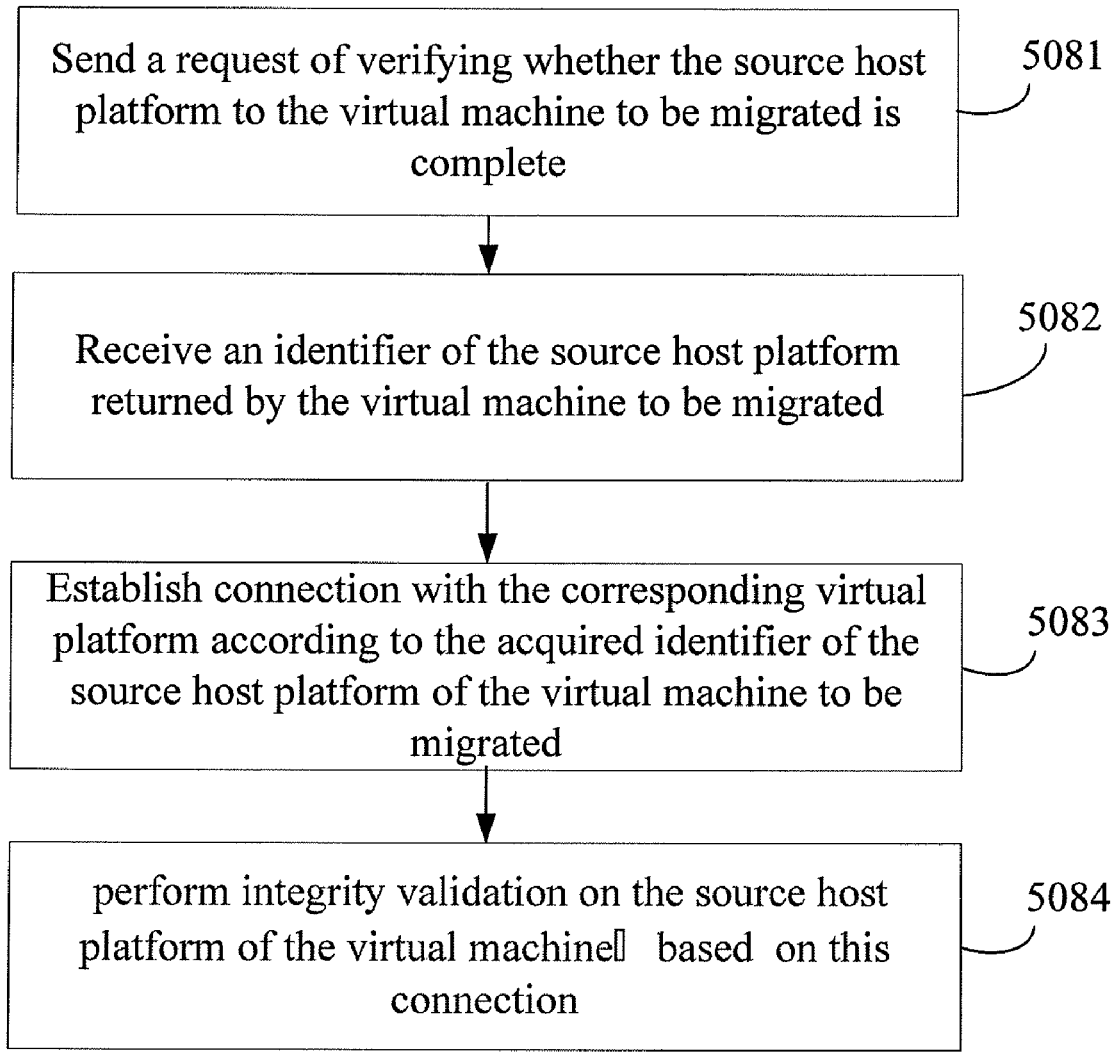
FIG. 8 is a schematic flow chart of step S508 in FIG. 7.

Step S508: When finding that the object of integrity validation in step S507 is a virtual machine, the MA performs integrity validation on the source host platform of the virtual machine to be migrated, to obtain an integrity validation result of the source host platform. Specifically, the MA may obtain information that the object of integrity validation is a virtual machine from a key certificate for encryption. A specific process of step S508 is as shown in FIG. 8, and may include the following steps.

Step S081: The MA sends a request of performing integrity validation on the source host platform of the virtual machine to the virtual machine to be migrated.

Step S082: The virtual machine to be migrated returns an identifier of the source host platform thereof to the MA, that is, the MA receives the identifier of the source host platform returned by the virtual machine to be migrated, in which the identifier means information enabling the MA to establish connection with the source host platform, such as, IP address and name of the source host platform, or essential correlation parameters between the virtual machine and the source host platform (that is, the source platform).

Step S083: The MA establishes a connection with the corresponding virtual platform according to the acquired identifier of the source host platform of the virtual machine to be migrated.

Step S084: Based on this connection, the MA performs integrity validation on the source host platform of the virtual machine, to obtain an integrity validation result of the source host platform. Details may be made reference to the prior art, and thus is not further described herein again.

Step S509: The MA makes a decision about whether to permit the virtual machine to be migrated according to the security check result of the source platform, the security check result of the target platform, the status information evaluation result of the virtual machine to be migrated, the integrity validation result of the virtual machine to be migrated, and the integrity validation result of the source platform.

Step S510: The MA sends a corresponding migration decision-making result respectively to the source platform and the target platform.

Step e): Send the decision-making result of whether to permit the virtual machine to be migrated to the source platform. If the migration is permitted, step S511 is performed; and if the migration is not permitted, the implementation is stopped, and optionally, a reason why the migration is not permitted is returned.

Step f): Send the decision-making result of whether to permit the virtual machine to be migrated to the target platform. If the migration is permitted, step S511 is performed; and if the migration is not permitted, the implementation is stopped, and optionally, a reason why the migration is not permitted is returned. It should be noted that only for easy of description herein, the order of steps e) and f) may be arbitrary, and step f) is an optional step.

Step S511: Establish a connection between the source platform and the target platform, to implement the specific migration, which is within the prior art, and thus is not described in detail herein again. It should be noted that the security check result of the source platform in step S502 may be considered as a first evaluation result of the source platform, and the security check result of the source platform does not include the integrity validation result of the source platform. The security check result of the target platform in step S504 may be considered as a second evaluation result of the target platform.

To sum up, in the embodiment of the present invention, based on the security checks on the source platform and the target platform, a process of evaluating the status information of the virtual machine to be migrated and performing integrity validation on the virtual machine to be migrated is further included, and the decision-making result of whether to permit the virtual machine to be migrated to the target platform is made according to the security check results of the source platform and the target platform, and the status information evaluation result and the integrity validation result of the virtual machine to be migrated. That is, the migration is permitted on the basis of meeting the evaluation requirements from the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

Figure 9:
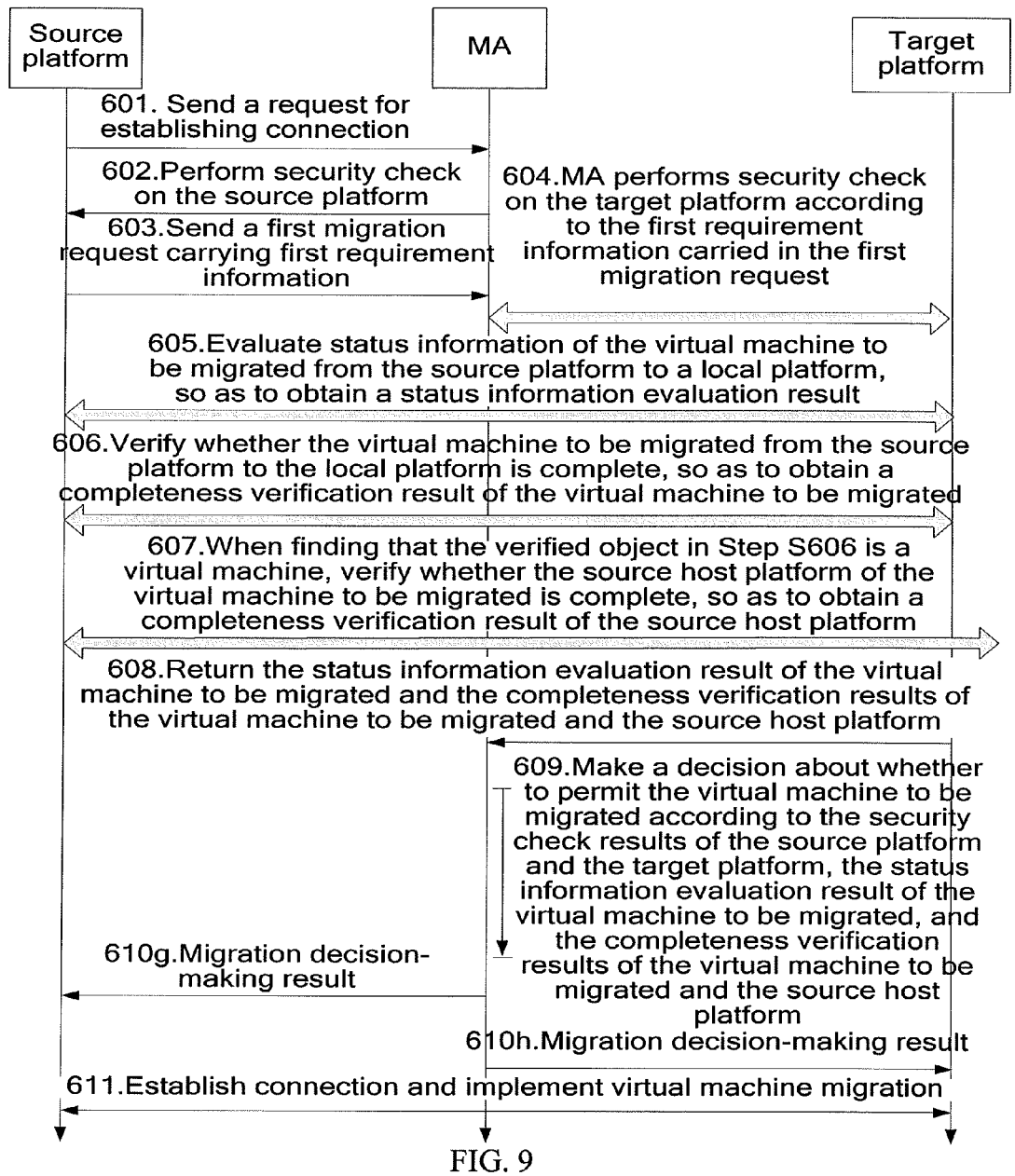
FIG. 9 is a schematic interaction diagram of another method for making a decision about virtual machine migration according to an embodiment of the present invention.

FIG. 9 is a schematic interaction diagram of another method for making a decision about virtual machine migration according to an embodiment of the present invention. As shown in FIG. 9, in an embodiment of the present invention, in iterative integrity validations of a virtual machine to be migrated and a source host platform thereof, a target platform plays the role of remote challenger, that is, status information evaluation of the virtual machine to be migrated, and the iterative integrity validations of the virtual machine to be migrated and the source host platform thereof are performed by the target platform. The method may include the following steps:

Step S601: The source platform sends a request for establishing connection to an MA, in which the request for establishing connection carries a connection establishment objective, that is, a migration request of a virtual machine on the source virtual platform.

Step S602: The MA performs security check on the source platform, for example, ID validity check on the source platform, to obtain a security check result of the source platform (for example, an ID validity check result). Optionally, the source platform may further perform check on the MA (mainly perform check against ID validity of the MA). If the check on the source platform, or the checks on the source platform and the MA are passed, step S603 is performed; and if no, the migration is not permitted, the implementation is stopped and the process is ended. It should be noted that the integrity validation of the source platform is not performed in this step.

Step S603: The source platform sends a first migration request to the MA, in which the first migration request carries first requirement information for the target platform by the virtual machine to be migrated, and the first requirement information may include attribute requirements for the target platform by the source platform, and optionally may further include an identifier of the target platform.

Step S604: The MA performs security check on the target platform according to the first requirement information carried in the first migration request. MA. A specific process may include: performing attribute match check and/or integrity validation on the target platform, to obtain a security check result of the target platform (for example, an attribute match check result and/or an integrity validation result). If the attribute match check is passed, the integrity validation on the target platform is performed; and if no, the migration is not permitted, and the implementation is stopped. If the integrity validation is passed, step S605 is performed; if the integrity validation is not passed, the migration is not permitted, and the implementation is stopped; and optionally, a reason why the migration is not permitted may be sent to the source platform.

Step S605: The target platform evaluates the status information of the virtual machine to be migrated from the source platform to a local platform, to obtain a status information evaluation result, and details may be made reference to step S405.

Step S606: The target platform performs integrity validation on the virtual machine to be migrated on the source platform, to obtain an integrity validation result of the virtual machine to be migrated, and a specific process may be made reference to step S307.

Step S607: When finding that the object of integrity validation in step S507 is a virtual machine, the target platform performs integrity validation on the source host platform of the virtual machine to be migrated, to obtain an integrity validation result of the source host platform. A specific process of step S607 may be made reference to FIG. 8, and may include the following steps.

Step 6071: The target platform sends a request of performing integrity validation on the source host platform of the virtual machine to the virtual machine to be migrated.

Step 6072: The virtual machine to be migrated returns an identifier of the source host platform to the target platform, in which the identifier means information enabling the target platform to establish connection with the source host platform, such as, IP address and name of the source host platform, or essential correlation parameters between the target platform and the source host platform (that is, the source platform).

Step 6073: The target platform establishes a connection with the source host platform according to the acquired identifier of the source host platform of the virtual machine to be migrated.

Step 6074: Based on this connection, the target platform performs integrity validation on the source host platform of the virtual machine to be migrated, to obtain an integrity validation result of the source host platform, and details may be made reference to the prior art, and thus is not further described herein again.

Step S608: The target platform sends the status information evaluation result of the virtual machine to be migrated and the integrity validation results of the virtual machine to be migrated and the source host platform to the MA, after completing the status information evaluation of the virtual machine to be migrated and the integrity validations of the virtual machine to be migrated and the source host platform iteration.

Step S609: The MA makes a decision about whether to permit the virtual machine to be migrated according to the security check result of the source platform, the security check result of the target platform, and the received status information evaluation result of the virtual machine to be migrated, integrity validation result of the virtual machine to be migrated, and integrity validation result of the source host platform.

Step S610: The MA sends a corresponding migration decision-making result respectively to the source platform and the target platform.

Step g): Send the decision-making result of whether to permit the virtual machine to be migrated to the source platform, if the migration is permitted, step S611 is performed; and if the migration is not permitted, the implementation is stopped, and optionally, a reason why the migration is not permitted is returned.

Step h): Send the decision-making result of whether to permit the virtual machine to be migrated is sent to the target platform. If the migration is permitted, step S611 is performed; and if the migration is not permitted, the implementation is stopped, and optionally, a reason why the migration is not permitted is returned. It should be noted that only for easy of description herein, the order of steps g) and h) may be arbitrary, and step h) is an optional step.

Step S611: Establish a connection between the source platform and the target platform, so as to implement the specific migration, which is within the prior art, and thus is not described in detail herein again. It should be noted that the security check result of the source platform in step S602 may be considered as a first evaluation result of the source platform, and the security check result of the source platform does not include the integrity validation result of the source platform. The security check result of the target platform in step S6504 may be considered as a second evaluation result of the target platform.

To sum up, in the embodiment of the present invention, based on the security checks on the source platform and the target platform, a process of evaluating the status information of the virtual machine to be migrated and performing integrity validation on the virtual machine to be migrated is further included, and the decision-making result of whether to permit the virtual machine to be migrated to the target platform is made according to the security check result of the source platform, the security check result of the target platform, the status information evaluation result of the virtual machine to be migrated, the integrity validation result of the virtual machine to be migrated, and the integrity validation result of the source host platform. That is, the migration is permitted on the basis of meeting the evaluation requirements of the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

The evaluation and integrity validation of the virtual machine to be migrated, which are performed by different bodies, are different in processes. For example, if the evaluation is performed by the target platform, the target platform needs to acquire a identifier parameter of the virtual machine on the source platform first; if the evaluation is performed by the MA, the target platform needs to send the desired evaluation requirements to the MA; and if the evaluation is performed by the source platform, integrity validation is necessary in check on the source platform, so as to ensure the trusted foundations of the source platform, so that the source platform can faithfully provide the check result of the virtual machine during the status information evaluation and the integrity validation of the virtual machine on the local virtual platform, where the status information evaluation and the integrity validation are performed by the source platform.

Figure 10A:
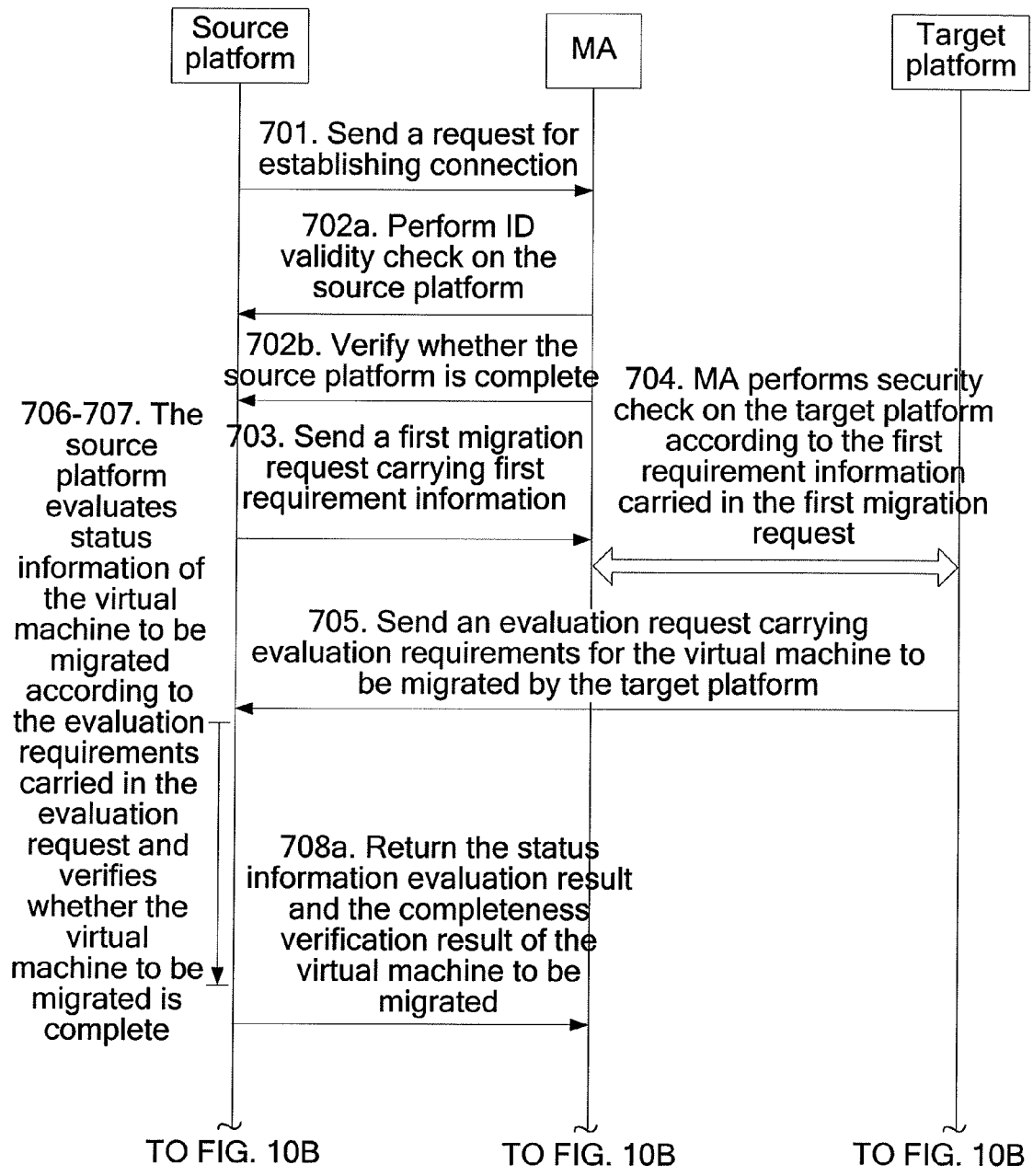
FIGS. 10A and 10B are a schematic interaction diagram of another method for making a decision about virtual machine migration according to an embodiment of the present invention.
Figure 10B:
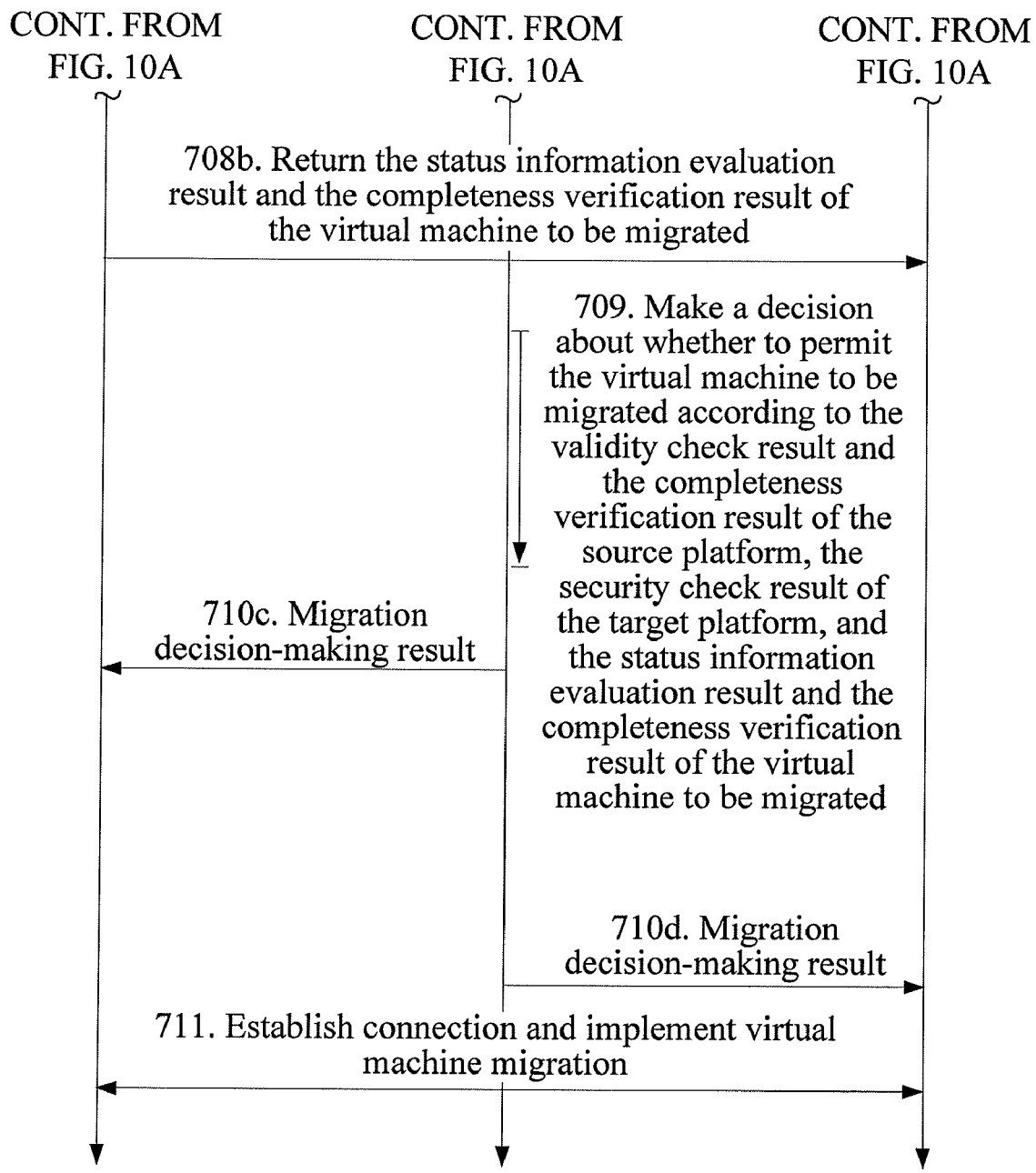

FIG. 10 is a schematic interaction diagram of another method for making a decision about virtual machine migration according to an embodiment of the present invention. As shown in FIG. 10, in an embodiment of the present invention, status information evaluation and integrity validation of a virtual machine to be migrated are performed by a source platform. The method may include the following steps.

Step S701: The source platform sends a request for establishing connection to an MA, in which the request for establishing connection carries a connection establishment objective, that is, a migration request of a virtual machine on a source virtual platform.

Step S702: The MA performs security check on the source platform, to obtain a security check result of the source platform. A specific process may include the following steps.

Step a: The MA performs ID validity check on the source platform. The source platform may optionally perform check on the MA (mainly perform check against ID validity of the MA). If the ID validity check on the source platform, or the checks on the source platform and the MA are passed, step b is performed; and if no, the migration is not permitted, the implementation is stopped and the process is ended.

Step b: The MA performs integrity validation on the source platform. If an integrity validation result satisfies a trusted attribute, step S703 is performed; and if no, the migration is not permitted, and the implementation is stopped.

Step S703: The source platform sends a first migration request to the MA, in which the first migration request carries first requirement information for the target platform by a virtual machine to be migrated, and the first requirement information may include attribute requirements for the target platform by the source platform, and optionally may further include an identifier of the target platform.

Step S704: The MA performs security check on the target platform according to the first requirement information carried in the first migration request. A specific process may include: performing attribute match check and/or integrity validation on the target platform, to obtain a security check result of the target platform (for example, an attribute match check result and/or an integrity validation result). If the attribute match check is passed, the integrity validation on the target platform is performed; and if no, the migration is not permitted, and the implementation is stopped. If the integrity validation is passed, step S705 is performed; if the integrity validation is not passed, the migration is not permitted, and the implementation is stopped; and optionally, a reason why the migration is not permitted may be sent to the source platform.

Step S705: The target platform sends an evaluation request to the source platform, in which the evaluation request carries evaluation requirements from the target platform for the virtual machine to be migrated, and the evaluation requirements include mandatory evaluation attributes, and optionally, may further include additional evaluation attributes.

Step S706: The source platform evaluates status information of the virtual machine to be migrated according to the evaluation requirements carried in the evaluation request. A specific process may include the following steps. The source platform compares information of attributes to be evaluated acquired from the virtual machine to be migrated and a local virtual platform with a corresponding evaluation standard acquired from the MA, according to the evaluation requirements carried in the evaluation request, and acquires a status information evaluation result according to a result obtained by performing comparison. If the status information evaluation result indicates that the evaluation is passed, step 707 is performed; if the status information evaluation result indicates that the evaluation is not passed, the migration is not permitted, and the implementation is stopped; and optionally, a reason why the migration is not permitted may be returned.

Step S707: The source platform performs integrity validation on the virtual machine to be migrated, to obtain an integrity validation result of the virtual machine to be migrated, and a specific process may be made reference to step S307.

Step S708: The source platform returns the status information evaluation result and the integrity validation result of the virtual machine to be migrated.

Step a): Send the status information evaluation result and the integrity validation result of the virtual machine to be migrated to the MA.

Step b): Send the status information evaluation result and the integrity validation result of the virtual machine to be migrated are sent to the target platform.

Step S709: The MA makes a decision about whether to permit the virtual machine to be migrated according to the security check result of the source platform, the security check result of the target platform, and the status information evaluation result and the integrity validation result of the virtual machine to be migrated.

Step S710: The MA sends a corresponding migration decision-making result respectively to the source platform and the target platform.

Step c): Send the migration decision-making result of whether to permit the virtual machine to be migrated to the source platform, if the migration is permitted, step S711 is performed; and if the migration is not permitted, the implementation is stopped, and a reason why the migration is not permitted is returned.

Step d): Send the migration decision-making result of whether to permit the virtual machine to be migrated to the target platform, if the migration is permitted, step S711 is performed; and if the migration is not permitted, the implementation is stopped, and a reason why the migration is not permitted is returned. It should be noted that only for easy of description herein, the order of steps e) and d) may be arbitrary, and step d) is an optional step.

Step S711: Establish a connection between the source platform and the target platform, to implement the specific migration, which is within the prior art, and thus is not described in detail herein again. It should be noted that the security check result of the source platform in step S702 may be considered as a first evaluation result of the source platform, and the security check result of the target platform in step S704 may be considered as a second evaluation result of the target platform.

To sum up, in the embodiment of the present invention, based on the security checks on the source platform and the target platform, a process of evaluating the status information of the virtual machine to be migrated and performing integrity validation on the virtual machine to be migrated is further included, and the decision-making result of whether to permit the virtual machine to be migrated to the target platform is made according to the security check results of the source platform and the target platform, and the status information evaluation result and the integrity validation result of the virtual machine to be migrated. That is, the migration is permitted on the basis of meeting the evaluation requirements of the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making.

Though in the embodiments above, the status information evaluation and the integrity validation of the virtual machine to be migrated are completed by a same main implementation body, it should be understood that they may be completed separately by different main implementation bodies. For example, the status information evaluation may be performed by the MA, and the integrity evaluation is performed by the target platform; and the status information evaluation may be performed by the target platform, the integrity evaluation is performed by the MA, but the present invention includes, but is not limited two these scenarios. Correspondingly, if the status information evaluation and the integrity validation of the virtual machine to be migrated are performed by different implementation bodies, burden caused by completing the evaluation and the integrity validation by a single main implementation body to the single main implementation body can be avoided, and the opportunity that the main implementation body suffers from Denial-of-Service (DoS) attack can be lowered.

Figure 11:
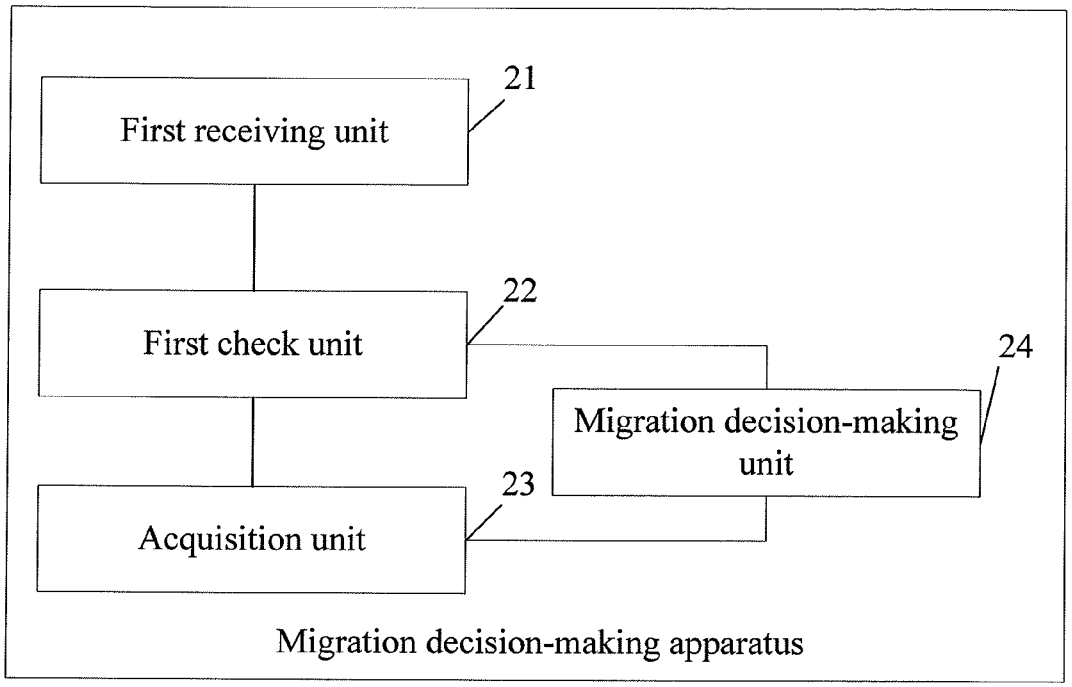
FIG. 11 is a schematic structural view of an apparatus for making a decision about virtual machine migration according to an embodiment of the present invention.

FIG. 11 is a schematic structural view of an apparatus for making a decision about virtual machine migration according to an embodiment of the present invention. As shown in FIG. 11, the apparatus for making a decision about virtual machine migration of the present invention may include a first receiving unit 21, a first check unit 22, an acquisition unit 23, and a migration decision-making unit 24.

The first receiving unit 21 is configured to receive a migration request sent from a source host platform (source platform) of a virtual machine to be migrated. Specifically, the migration request carries evaluation requirements from the source host platform (and optionally, the virtual machine to be migrated) for a target host platform (target platform) of the virtual machine to be migrated.

In a practical scenario, when the source platform transmits the migration request, if the target platform of the virtual machine to be migrated and the evaluation requirements for the target platform are determined, the migration request carries the evaluation requirements from the source platform for the target platform and an identifier of the target platform; and if the evaluation requirements for the target platform are determined, but there is no specific target platform, in this scenario, an apparatus for making a decision about virtual machine migration needs to select a suitable target platform for the virtual machine to be migrated according to relevant strategies for the source platform and in the whole system architecture.

The first check unit 22 is configured to perform security checks on the source host platform and the target platform according to the migration request, to obtain a first evaluation result of the source host platform and a second evaluation result of the target platform.

It should be noted that the security check on the source host platform may include ID validity check or integrity validation, and the security check on the target platform may include attribute match check or integrity validation.

The acquisition unit 23 is configured to acquire a third evaluation result of the virtual machine to be migrated.

The migration decision-making unit 24 is configured to return a corresponding migration decision-making result to the source platform and the target platform according to the first evaluation result of the source platform, the second evaluation result of the target platform, and the third evaluation result of the virtual machine to be migrated. Specifically, the corresponding migration decision-making result is returned to the source platform according to the first evaluation result of the source platform, the second evaluation result of the target platform, the third evaluation result of the virtual machine to be migrated, and a migration strategy, and optionally, the corresponding migration decision-making result may be further returned to the target platform. The migration strategy, in an implementation, may be that if the first evaluation result of the source platform, the second evaluation result of the target platform, and the third evaluation result of the virtual machine to be migrated all indicate that evaluation is passed, the virtual machine is permitted to be migrated; if the first evaluation result of the source platform, the second evaluation result of the target platform, and the third evaluation result of the virtual machine to be migrated not all indicate that evaluation is passed, the virtual machine is not permitted to be migrated.

In an implementation, the acquisition unit 23 includes a status information evaluation sub-unit, configured to evaluate status information of the virtual machine to be migrated (specifically, evaluate the status information of the virtual machine to be migrated according to evaluation requirement for the virtual machine to be migrated, from the target platform), to obtain a status information evaluation result; and/or an integrity validation sub-unit, configured to perform integrity validation on the virtual machine to be migrated on the source platform, to obtain a first integrity validation result of the virtual machine to be migrated.

Alternatively, in another implementation, the acquisition unit 23 is a second receiving unit, configured to receive a status information evaluation result of the virtual machine to be migrated and/or a first integrity validation result of the virtual machine to be migrated sent from the target platform or the source platform.

Alternatively, in another implementation, the acquisition unit 23 includes a status information evaluation sub-unit, configured to evaluate status information of the virtual machine to be migrated (specifically, evaluate the status information of the virtual machine to be migrated according to evaluation requirement for the virtual machine to be migrated, from the target platform), to obtain a status information evaluation result; and a first receiving sub-unit, configured to receive an integrity validation result of the virtual machine to be migrated sent from the source platform or the target platform.

Alternatively, in another implementation, the acquisition unit 23 includes a second receiving sub-unit, configured to receive a status information evaluation result of the virtual machine to be migrated sent from the source platform or the target platform; and an integrity validation sub-unit, configured to perform integrity validation on the virtual machine to be migrated on the source platform, to obtain a first integrity validation result of the virtual machine to be migrated.

Therefore, the migration decision-making unit is specifically configured to return a corresponding migration decision-making result to the source host platform according to the first evaluation result, the second evaluation result, the status information evaluation result and/or the first integrity validation result of the virtual machine to be migrated.

Also, in an implementation, the status information evaluation sub-unit is specifically configured to receive an evaluation request sent from the target platform, in which the evaluation request carries evaluation requirements from the target platform for the virtual machine to be migrated; acquire information of attributes to be evaluated from the virtual machine to be migrated and the source host platform thereof according to the evaluation requirements carried in the evaluation request; and obtain the status information evaluation result according to a result obtained by comparing the acquired information of the attributes to be evaluated and a corresponding evaluation standard. The evaluation requirements include mandatory evaluation attributes including owner of the virtual machine, use of the virtual machine, and relevant information of historical host platforms of the virtual machine; or the evaluation requirements include mandatory evaluation attributes including owner of the virtual machine, use of the virtual machine, and relevant information of historical host platforms of the virtual machine; and additional evaluation attributes including one or more of the following attributes: requirements for a virtual device of the virtual machine and for the use of physical hardware resources of the virtual machine, detailed information of operating systems used and main application programs that run on the virtual machine, time logs of the virtual machine, and internal security strategy of the virtual machine. As for the mandatory evaluation attributes of the evaluation requirements, only evaluations for mandatory evaluation attributes are all passed, the status information evaluation is passed; if evaluations for mandatory evaluation attributes are not all passed, the status information evaluation is not passed.

In addition, it should be further noted that while the target platform advances the evaluation requirements according to the local status and configuration strategies, standards achieving these requirements need to be defined, and the standards are quantifiable at possible, for example, maximal memory capacity that can be provided by the target platform at present, and a kernel version of operating system Linux operating in the virtual machine of at least 2.6 or later; and that though the evaluation requirements for the target platform are changed according to the difference of the local demands of the target platform, the evaluation requirements need to be essential evaluation options in status information evaluation once being advanced by the target platform.

Correspondingly, in an implementation, the migration decision-making unit 24 is specifically configured to make a decision that the virtual machine is permitted to be migrated, if the first evaluation result of the source platform, the second evaluation result of the target platform, the status information evaluation result and/or the first integrity validation result of the virtual machine to be migrated all indicate that evaluation is passed; to make a decision that the virtual machine is not permitted to be migrated, if the first evaluation result of the source platform, the second evaluation result of the target platform, the status information evaluation result and/or the first integrity validation result of the virtual machine to be migrated not all indicate that evaluation is passed; and return a corresponding migration decision-making result to the source platform.

The apparatus for making a decision about virtual machine migration according to the embodiment may be an MA. The MA acts as a trusted third-party in a virtual machine migration process.

Units in the apparatus according to the embodiment of the present invention may be integrated together or deployed separately. The above units may be combined into one unit, or further divided into a plurality of sub-units.

The specific implementations of the above functional unit may be made reference to the descriptions in method embodiments.

According to the apparatus for making a decision about virtual machine migration of the embodiment of the present invention, it can be seen that based on the security checks on the source platform and the target platform, a process of evaluating the status information of the virtual machine to be migrated and/or performing integrity validation on the virtual machine to be migrated is further included, and the decision-making result of whether to permit the virtual machine to be migrated to the target platform is made according to the first evaluation result of the source platform, the second evaluation result of the target platform, and the third evaluation result (the status information evaluation result and/or the integrity validation result) of the virtual machine to be migrated. That is, the migration is permitted on the basis of meeting the evaluation requirements of the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

Figure 12:
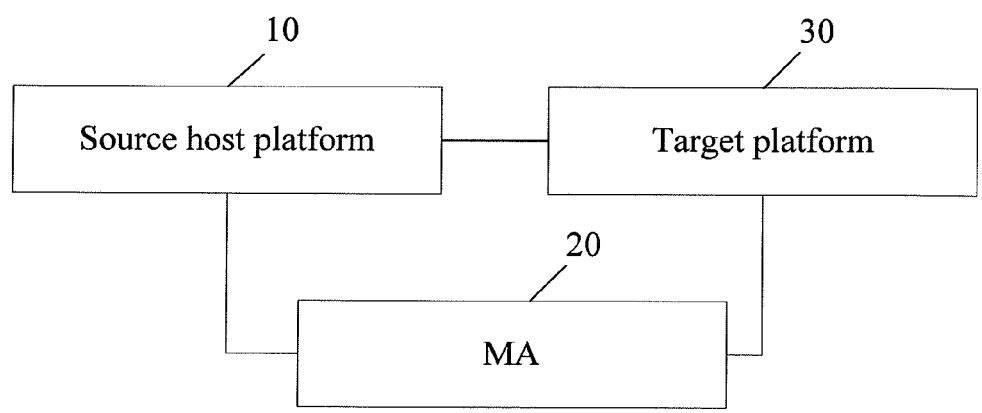
FIG. 12 is a schematic structural view of a communication system according to an embodiment of the present invention.

As shown in FIG. 12, in an embodiment, the present invention provides a communication system, which may include a source host platform 10 of a virtual machine to be migrated, an MA 20, and a target host platform (target platform) 30 of the virtual machine to be migrated.

The source host platform 10 is configured to send a migration request to the MA 20, and migrate the virtual machine to be migrated to the target host platform 30 according to a received migration decision-making result. Specifically, the migration request carries evaluation requirements from the source host platform (and optionally, the virtual machine to be migrated) for the target platform. A specific implementation of the migration may be made reference to the prior art, and is not described in detail herein again.

In a practical scenario, when the source host platform 10 transmits the migration request, if the target platform of the virtual machine to be migrated and evaluation requirements for the target platform are determined, the migration request carries the evaluation requirements for the target platform by the source platform and an identifier of the target platform; and if the evaluation requirements for the target platform are determined, but there is no specific target platform, in this scenario, the MA 20 selects a suitable target platform for the virtual machine to be migrated according to relevant strategies for the source platform and in the whole system architecture.

The MA 20 is configured to perform security checks on the source host platform 10 and the target host platform 30 according to the migration request, to obtain a first evaluation result of the source host platform and a second evaluation result of the target host platform; acquire a third evaluation result of the virtual machine to be migrated; return a corresponding migration decision-making result to the source host platform 10 according to the first evaluation result, the second evaluation result, and the third evaluation result; and optionally, return a corresponding migration decision-making result to the target platform 30.

The target host platform 30 is configured to accept the virtual machine to be migrated, or is considered to accept (or support) the virtual machine to be migrated.

In an implementation, the target platform 30 is further configured to send an evaluation request to the MA 20, in which the evaluation request carries evaluation requirements for the evaluation requirements by the target platform; and the evaluation requirements include mandatory evaluation attributes including owner of the virtual machine (which means a user controlling the virtual machine), use of the virtual machine, and relevant information of historical host platforms of the virtual machine including host history of the virtual machine (that is, all virtual platforms which host the virtual machine from the creation of the virtual machine to a current persistent migration process) and time logs on each host platform mainly involving immigration and emigration time.

According to the difference of local requirements, status, and configuration strategies, the target platform may further optionally include one or more of additional evaluation attributes such as requirements for a virtual device of the virtual machine (for example, number of virtual CPUs and virtual memory capacity) and the use of physical hardware resources of the virtual machine; detailed information of operating systems used and main application programs that run on the virtual machine; time logs of the virtual machine, including life cycle, creation time, sleep time, boot time and logout time of the virtual machine; or security strategy in the virtual machine, for example, an access control used by the virtual machine of either a discretionary access control strategy or a mandatory access control strategy (if the latter, setting bases and manners of security label and security level are specifically included), security model used in virtual machine security assurance, and key points in security assurance (integrity, confidentiality, or both that need to be assured).

The MA 20 is specifically configured to perform security checks on the source host platform and the target platform according to the migration request, to obtain a first evaluation result of the source host platform and a second evaluation result of the target platform; evaluate status information of the virtual machine to be migrated according to the evaluation requirements carried in the evaluation request, to obtain a status information evaluation result (specifically, acquire information of attributes to be evaluated from the virtual machine to be migrated and the source host platform thereof according to the evaluation requirements carried in the evaluation request, and obtain a status information evaluation result according to a result obtained by comparing the acquired objects to be evaluated and a corresponding evaluation standard saved in the MA; it should be noted, as for the mandatory evaluation attributes of the evaluation requirements, only evaluations for mandatory evaluation attributes are all passed, the status information evaluation is passed; if evaluations for mandatory evaluation attributes are not all passed, the status information evaluation is not passed); optionally perform integrity validation on the virtual machine to be migrated on the source platform, to obtain a first integrity validation result of the virtual machine to be migrated; and return a corresponding migration decision-making result to the source host platform according to the first evaluation result, the second evaluation result, and the status information evaluation result and/or the first integrity validation result.

Optionally, the MA 20 is further configured to perform integrity validation on the source host platform after performing integrity validation on the virtual machine to be migrated on the source platform, to obtain a second integrity validation result of the source host platform; and specifically, send a request of performing integrity validation on the source host platform of the virtual machine to be migrated, receive an identifier of the source platform returned by the virtual machine to be migrated, establish connection with the corresponding source platform according to the identifier of the source platform, perform integrity validation on the source host platform of the virtual machine to be migrated based on the connection, to obtain a second integrity validation result of the source host platform. As a result, iterative integrity validation is achieved. It should be noted that the iterative integrity validation is suitable in a scenario in which integrity validation of the source platform is not performed in the security check process of the source platform above.

In another implementation, the target platform 30 is further configured to evaluate status information of the virtual machine to be migrated according to the evaluation requirements for the virtual machine to be migrated, to obtain a status information evaluation result (specifically, acquire information of attributes to be evaluated from the virtual machine to be migrated and the source host platform thereof according to the evaluation requirements for the virtual machine to be migrated; and match the acquired information of the attributes to be evaluated with a corresponding evaluation standard locally stored in the target platform, to obtain a status information evaluation result according to a match result); and/or configured to perform integrity validation on the virtual machine to be migrated on the source platform 10, to obtain a first integrity validation result of the virtual machine to be migrated, and return the status information evaluation result and/or the first integrity validation result of the virtual machine to be migrated to the MA.

The MA 20 is specifically configured to perform security checks on the source host platform 10 and the target host platform 30 according to the migration request, to obtain a first evaluation result of the source host platform and a second evaluation result of the target host platform; receive the status information evaluation result and/or the first integrity validation result of the virtual machine to be migrated sent from the target platform; and return a corresponding migration decision-making result to the source host platform 10 according to the first evaluation result, the second evaluation result, and the status information evaluation result and/or the first integrity validation result.

Optionally, the target platform 30 is further configured to perform integrity validation on the source host platform after performing integrity validation on the virtual machine to be migrated on the source platform, to obtain a second integrity validation result of the source host platform; and specifically, send a request of perform integrity validation on the source platform to the virtual machine to be migrated; receive an identifier of the source platform returned from the virtual machine to be migrated; and establish connection with the corresponding source platform according the identifier of the source platform, and perform integrity validation on the source host platform of the virtual machine to be migrated based on the connection, to obtain a second integrity validation result. In this way, iterative integrity validation is achieved. It should be noted that the iterative integrity validation is suitable in a scenario in which integrity validation of the source platform is not performed in the security check process of the source platform above.

In another implementation, the target platform 30 is further configured to send an evaluation request to the source platform, in which the evaluation request carries evaluation requirements from the target platform for the virtual machine to be migrated.

The source platform 10 is further configured to evaluate status information of the virtual machine to be migrated according to the evaluation requirements carried in the evaluation request, to obtain a status information evaluation result (specifically, compare the information of the attributes to be evaluated acquired from the virtual machine to be migrated and a local virtual platform with a corresponding evaluation standard acquired from the MA according to the evaluation requirements carried in the evaluation request, to obtain a status information evaluation result according to a result obtained by performing comparison; it should be noted that as for the mandatory evaluation attributes of the evaluation requirements, only evaluations for the mandatory evaluation attributes are all passed, the status information evaluation is passed; if evaluations for the mandatory evaluation attributes are not all passed, the status information evaluation is not passed); and/or, configured to perform integrity validation on the virtual machine to be migrated, to obtain a first integrity validation result of the virtual machine to be migrated, and return the status information evaluation result and/or the first integrity validation result of the virtual machine to be migrated to the MA.

The MA 20 is specifically configured to perform security checks on the source host platform 10 and the target host platform 30 according to the migration request, to obtain a first evaluation result of the source host platform and a second evaluation result of the target host platform; receive the status information evaluation result and/or the first integrity validation result of the virtual machine to be migrated sent from the source host platform; and return a corresponding migration decision-making result to the source host platform 10 according to the first evaluation result, the second evaluation result, and the status information evaluation result and/or the first integrity validation result.

It should be understood that the source platform and the target platform according to the embodiment of the present invention means a computing platform capable of deploying the virtualization technology and running a virtual machine thereon in broad sense; and means servers and PCs different from each other in narrow sense.

The MA is a third-party entity trusted by the source platform and the target platform, and may be a single server or a PC, or a virtual machine having a specific function (responsible for migration decision making herein) that runs on another virtual platform virtual machine.

In the system according to the embodiment of the present invention, it can be seen that, based on the security checks on the source platform and the target platform, a process of evaluating the status information of the virtual machine to be migrated and performing integrity validation on the virtual machine to be migrated is further included, and the decision-making result of whether to permit the virtual machine to be migrated to the target platform is made according to the first evaluation result of the source platform, the second evaluation result of the target platform, and the third evaluation result of the virtual machine to be migrated (for example, the status information evaluation result and/or the integrity validation result of the virtual machine to be migrated). That is, the migration is permitted on the basis of meeting the evaluation requirements of the target platform, while the completeness of the decision-making bases is reinforced (the bases of making a decision about whether to permit the virtual machine to be migrated are taken into full consideration), thereby ensuring that the influence of the migration result on the target platform is minimized, preventing the security threat or other influences caused by the virtual machine after migration to the target platform, and reinforcing the correctness of the migration decision making. Therefore, not only the security of the virtual machine after migration to the target platform, but also the security of the target platform after accepting the virtual machine is ensured.

It should be noted that terms "first", "second", and "third" as used in descriptions of the above embodiments are provided only for ease of discrimination, instead of limiting the order.

Those of ordinary skill in the art should understand that all or a part of the steps of the method according to the embodiments of the present invention may be implemented by a computer program instructing relevant hardware. The program may be stored in a computer readable storage medium. When the program is run, the steps of the method according to the embodiments are performed. The storage medium may be, for example, a magnetic disk, an optical disk, a Read-Only Memory (ROM), or a Random Access Memory (RAM).

The above descriptions are merely specific embodiments of the present invention. It should be understood that improvements and modifications can be made by those of ordinary skill in the art without departing from the principle of the present invention, and these improvements and modifications should fall within the scope of the present invention.

What is claimed is:

1. A method for making a decision about virtual machine migration, comprising:

receiving a migration request sent from a source host platform of a virtual machine to be migrated;

performing security evaluation checks on the source host platform of the virtual machine to be migrated and on a target host platform of the virtual machine to be migrated according to the migration request, in order to obtain a first evaluation result of the source host platform and a second evaluation result of the target host platform;

acquiring a third evaluation result of the virtual machine to be migrated, wherein the acquiring of the third evaluation result of the virtual machine to be migrated comprising:

evaluating status information of the virtual machine to be migrated in order to obtain a status information evaluation result, wherein the evaluating the status information of the virtual machine to be migrated comprising:

receiving an evaluation request sent from the target host platform, wherein the evaluation request carries evaluation requirements from the target host platform for the virtual machine to be migrated, and the evaluation requirements comprise mandatory evaluation attributes, and the mandatory evaluation attributes comprise owner of the virtual machine, use of the virtual machine, and information of historical host platforms of the virtual machine;

acquiring information of attributes to be evaluated from the virtual machine to be migrated and the source host platform of the virtual machine to be migrated according to the evaluation requirements carried in the evaluation request; and obtaining the status information evaluation result according to a result obtained by comparing the required information of attributes to be evaluated and a corresponding evaluation standard, wherein the obtaining of the status information evaluation result comprising:

determining whether the owner of the virtual machine to be migrated and an owner of a virtual machine that runs on the target host platform belong to the same owner group; if yes, determining that the evaluation for the mandatory evaluation attribute is passed; if no, determining that the evaluation is not passed;

matching tasks that are performed by the virtual machine to be migrated and are acquired from the source host platform or the virtual machine to be migrated with types of task supported by the target host platform, and if the tasks that are performed by the virtual machine do match the types of task supported by the target host platform, determining that the evaluation for the mandatory evaluation attribute is passed;

if the tasks that are performed by the virtual machine do not match the types of task supported by the target host platform, determining that the evaluation is not passed;

matching information of a first historical host platform acquired from the source host platform with corresponding time logs of security events, and if there is no security event occurred when the virtual machine to be migrated is running on each historical host platform, or if there is a security event occurred when the virtual machine to be migrated is running on a historical host platform, and the security level of the occurred security event is in a scope of the security level of the security event of the target host platform;

determining that the evaluation for the mandatory evaluation attribute is passed;

if the security level of the occurred security event is not in a scope of the security level of the security event of the target host platform, determining that the evaluation is not passed;

determining that the status information evaluation is passed if the evaluations for the mandatory evaluation attributes are all passed;

determining that the status information evaluation is not passed if the evaluations for the mandatory evaluation attributes are not all passed; and returning a corresponding migration decision-making result to the source host platform according to the first evaluation result, the second evaluation result, and the third evaluation result, wherein the corresponding migration decision-making result indicates whether the virtual machine is permitted to be migrated from the source host platform to the target host platform.

2. The method according to claim 1, wherein the acquiring of the third evaluation result of the virtual machine to be migrated comprising: performing integrity validation on the virtual machine to be migrated on the source host platform in order to obtain a first integrity validation result of the virtual machine to be migrated.

3. The method according to claim 2, wherein the performing of the integrity validation on the virtual machine to be migrated on the source host platform comprising:

acquiring a first extension value and measurement information from the virtual machine to be migrated;

calculating a second extension value according to the measurement information; and obtaining the first integrity validation result of the virtual machine to be migrated according to a result obtained by comparing the second extension value and the first extension value, and a result obtained by comparing the measurement information and an acquired standard value.

4. The method according to claim 2, wherein the returning of the corresponding migration decision-making result to the source host platform according to the first evaluation result, the second evaluation result, and the first integrity validation result of the virtual machine to be migrated, comprising:

making a decision that the virtual machine is permitted to be migrated if the first evaluation result, the second evaluation result, and the first integrity validation result of the virtual machine to be migrated all indicate that evaluation is passed; making a decision that the virtual machine is not permitted to be migrated if the first evaluation result, the second evaluation result, and the first integrity validation result of the virtual machine to be migrated not all indicate that evaluation is passed.

5. The method according to claim 1, wherein the acquiring of the third evaluation result of the virtual machine to be migrated comprising: evaluating status information of the virtual machine to be migrated in order to obtain a status information evaluation result; and performing integrity validation on the virtual machine to be migrated on the source host platform in order to obtain a first integrity validation result of the virtual machine to be migrated.

6. The method according to claim 5, wherein the returning of the corresponding migration decision-making result to the source host platform comprising:

making a decision that the virtual machine is permitted to be migrated if the first evaluation result, the second evaluation result, the status information evaluation result of the virtual machine to be migrated, and the first integrity validation result of the virtual machine to be migrated all indicate that evaluation is passed; making a decision that the virtual machine is not permitted to be migrated if the first evaluation result, the second evaluation result, the status information evaluation result of the virtual machine to be migrated, and the first integrity validation result of the virtual machine to be migrated not all indicate that evaluation is passed.

7. The method according to claim 1, wherein the acquiring of the third evaluation result of the virtual machine to be migrated comprising: receiving a status information evaluation result of the virtual machine to be migrated sent from the target host platform or the source host platform.

8. The method according to claim 1, wherein the acquiring of the third evaluation result of the virtual machine to be migrated comprising: receiving a first integrity validation result of the virtual machine to be migrated sent from the target host platform or the source host platform.

9. The method according to claim 1, wherein the acquiring of the third evaluation result of the virtual machine to be migrated comprising: receiving a status information evaluation result of the virtual machine to be migrated and a first integrity validation result of the virtual machine to be migrated sent from the target host platform or the source host platform.

10. The method according to claim 1, wherein the acquiring of the third evaluation result of the virtual machine to be migrated comprising: evaluating status information of the virtual machine to be migrated in order to obtain a status information evaluation result of the virtual machine to be migrated; and receiving a first integrity validation result of the virtual machine to be migrated sent from the source host platform or the target host platform.

11. The method according to claim 1, wherein the acquiring of the third evaluation result of the virtual machine to be migrated comprising: receiving a status information evaluation result of the virtual machine to be migrated sent from the source host platform or the target host platform; and performing integrity validation on the virtual machine to be migrated on the source host platform, to obtain a first integrity validation result of the virtual machine to be migrated.

12. The method according to claim 1, wherein the acquiring of the third evaluation result of the virtual machine to be migrated comprising: performing integrity validation on the virtual machine to be migrated on the source host platform, to obtain a first integrity validation result of the virtual machine to be migrated;

after performing the integrity validation on the virtual machine to be migrated on the source host platform, the method further comprising: performing integrity validation on the source host platform, to obtain a second integrity validation result of the source host platform.

13. The method according to claim 1, wherein the acquiring of the third evaluation result of the virtual machine to be migrated comprising: evaluating status information of the virtual machine to be migrated, to obtain a status information evaluation result; and performing integrity validation on the virtual machine to be migrated on the source host platform, to obtain a first integrity validation result of the virtual machine to be migrated;

after performing the integrity validation on the virtual machine to be migrated on the source host platform, the method further comprising:
performing integrity validation on the source host platform, to obtain a second integrity validation result of the source host platform.

14. The method according to claim 1, wherein the acquiring of the third evaluation result of the virtual machine to be migrated comprising: receiving a status information evaluation result of the virtual machine to be migrated sent from the source host platform or the target host platform; and perform integrity validation on the virtual machine to be migrated on the source host platform, to obtain a first integrity validation result of the virtual machine to be migrated;
after performing the integrity validation on the virtual machine to be migrated on the source host platform, the method further comprising:
performing integrity validation on the source host platform, to obtain a second integrity validation result of the source host platform.

15. The method according to claim 1, wherein the evaluation requirements further comprise additional evaluation attributes, wherein the additional evaluation attributes comprise one or more of the following attributes;
requirements for a virtual device of the virtual machine and for the use of physical hardware resources of the virtual machine, detailed information of operating systems used and main application programs that run on the virtual machine, time logs of the virtual machine, and internal security strategy of the virtual machine.

16. The method according to claim 1, wherein the returning of the corresponding migration decision-making result to the source host platform according to the first evaluation result, the second evaluation result, and the status information evaluation result of the virtual machine to be migrated, comprising:
making a decision that the virtual machine is permitted to be migrated if the first evaluation result, the second evaluation result, and the status information evaluation result of the virtual machine to be migrated all indicate that evaluation is passed; making a decision that the virtual machine is not permitted to be migrated if the first evaluation result, the second evaluation result, and the status information evaluation result of the virtual machine to be migrated not all indicate that evaluation is passed.

17. A communication system, comprising: a source host platform of a virtual machine to be migrated, a Migration Authority (MA), and a target host platform of the virtual machine to be migrated to, wherein the source host platform, the Migration Authority (MA) and the target host platform each comprises at least one of: a server or a personal computer, wherein:
the source host platform is configured to send a migration request to the MA, and migrate the virtual machine to be migrated to the target host platform according to a received migration decision-making result, wherein the received migration decision-making result indicates that the virtual machine is permitted to be migrated;
the MA is configured to:
perform security evaluation checks on the source host platform of the virtual machine to be migrated and on the target host platform of the virtual machine to be migrated according to the migration request, in order to obtain a first evaluation result of the source host platform and a second evaluation result of the target host platform;
acquire a third evaluation result of the virtual machine to be migrated, wherein the acquiring the third evaluation result of the virtual machine to be migrated comprising:
evaluating status information of the virtual machine to be migrated in order to obtain a status information evaluation result, and the evaluating of the status information of the virtual machine to be migrated comprising:
receiving an evaluation request sent from the target host platform, wherein the evaluation request carries evaluation requirements from the target host platform for the virtual machine to be migrated, and the evaluation requirements comprise mandatory evaluation attributes, and the mandatory evaluation attributes comprise owner of the virtual machine, use of the virtual machine, and information of historical host platforms of the virtual machine;
acquiring information of attributes to be evaluated from the virtual machine to be migrated and the source host platform of the virtual machine to be migrated according to the evaluation requirements carried in the evaluation request; and
obtaining the status information evaluation result according to a result obtained by comparing the required information of attributes to be evaluated and a corresponding evaluation standard, wherein the obtaining the status information evaluation result comprising:
determining whether the owner of the virtual machine to be migrated and an owner of a virtual machine that runs on the target host platform belong to the same owner group; if yes, determining that the evaluation for the mandatory evaluation attribute is passed; if no, determining that the evaluation is not passed;
matching tasks that are performed by the virtual machine to be migrated and are acquired from the source host platform or the virtual machine to be migrated with types of task supported by the target host platform, and
if the tasks that are performed by the virtual machine do match the types of task supported by the target host platform, determining that the evaluation for the mandatory evaluation attribute is passed;
if the tasks that are performed by the virtual machine do not match the types of task supported by the target host platform, determining that the evaluation is not passed;
matching information of a first historical host platform acquired from the source host platform with corresponding time logs of security events, and
if there is no security event occurred when the virtual machine to be migrated is running on each historical host platform, or
if there is a security event occurred when the virtual machine to be migrated is running on a historical host platform, and the security level of the occurred security event is in a scope of the security level of the security event of the target host platform;
determining that the evaluation for the mandatory evaluation attribute is passed;
if the security level of the occurred security event is not in a scope of the security level of the security event of the target host platform,
determining that the evaluation is not passed;
determining that the status information evaluation is passed if the evaluations for the mandatory evaluation attributes are all passed;

determining that the status information evaluation is not passed if the evaluations for the mandatory evaluation attributes are not all passed; and return the corresponding migration decision-making result to the source host platform according to the first evaluation result, the second evaluation result, and the third evaluation result; and the target host platform is configured to accept the virtual machine to be migrated.

18. The system according to claim 17, wherein:

security evaluation checks performed by the MA comprising performing integrity validation on the machine to be migrated on the source host platform, to obtain a first integrity validation result of the virtual machine to be migrated.

19. The system according to claim 17, wherein the target host platform is further configured to send an evaluation request to the MA, and the evaluation request carries evaluation requirements from the target host platform for the virtual machine to be migrated.

20. The system according to claim 17, wherein the MA is configured to perform integrity validation on the source host platform, to obtain a second integrity validation result of the source host platform.

21. The system according to claim 17, wherein the target host platform is further configured to evaluate status information of the virtual machine to be migrated according to evaluation requirements for the virtual machine to be migrated, to obtain a status information evaluation result of the virtual machine to be migrated, and return the status information evaluation result of the virtual machine to be migrated to the MA.

22. The system according to claim 17, wherein the target host platform is further configured to perform integrity validation on the virtual machine to be migrated on the source host platform, to obtain a first integrity validation result of the virtual machine to be migrated, and return the first integrity validation result of the virtual machine to be migrated to the MA.

23. The system according to claim 17, wherein the target host platform is further configured to perform integrity validation on the virtual machine to be migrated on the source host platform, to obtain a second integrity validation result of the source host platform; and return the first integrity validation result of the virtual machine to be migrated and the second integrity validation result of the source host platform to the MA; and the MA is specifically configured to perform security checks on the source host platform and the target host platform according to the first integrity validation result of the virtual machine to be migrated and the second integrity validation result of the source host platform sent from the target host platform.

24. The system according to claim 17, wherein the target host platform is further configured to evaluate status information of the virtual machine to be migrated according to evaluation requirements for the virtual machine to be migrated, to obtain a status information evaluation result of the virtual machine to be migrated; perform integrity validation on the virtual machine to be migrated on the source host platform, to obtain a first integrity validation result of the virtual machine to be migrated; perform integrity validation on the source host platform, to obtain a second integrity validation result of the source host platform; and return the status information evaluation result of the virtual machine to be migrated, the first integrity validation result of the virtual machine to be migrated, and the second integrity validation result of the source host platform to the MA.

25. The system according to claim 17, wherein the source host platform is further configured to evaluate status information of the virtual machine to be migrated according to the evaluation requirements carried in the evaluation request, to obtain a status information evaluation result; and return the status information evaluation result of the virtual machine to be migrated to the MA.

26. The system according to claim 17, wherein the source host platform is further configured to perform integrity validation on the virtual machine to be migrated, to obtain a first integrity validation result of the virtual machine to be migrated, and return the first integrity validation result of the virtual machine to be migrated to the MA.

27. The system according to claim 17, wherein the source host platform is further configured to evaluate status information of the virtual machine to be migrated according to the evaluation requirements carried in the evaluation request, to obtain a status information evaluation result; perform integrity validation on the virtual machine to be migrated, to obtain a first integrity validation result of the virtual machine to be migrated; and return the status information evaluation result of the virtual machine to be migrated and the first integrity validation result of the virtual machine to be migrated to the MA.

28. A Migration authority (MA) apparatus for making a decision about virtual machine migration, wherein the MA apparatus comprises at least one of:

a single server or a personal computer, and the MA apparatus comprises:

a first receiving unit, configured to receive a migration request sent from a source host platform of a virtual machine to be migrated;

a first check unit, configured to perform security checks on the source host platform of the virtual machine to be migrated and a target host platform of the virtual machine to be migrated according to the migration request, to obtain a first evaluation result of the source host platform and a second evaluation result of the target host platform;

an acquisition unit, configured to acquire a third evaluation result of the virtual machine to be migrated; and a migration decision-making unit, configured to return a corresponding migration decision-making result to the source host platform according to the first evaluation result, the second evaluation result, and the third evaluation result, wherein the corresponding migration decision-making result indicates whether the virtual machine is permitted to be migrated, wherein the acquiring of the third evaluation result of the virtual machine lo be migrated comprising:

evaluating status information of the virtual machine to be migrated in order to obtain a status information evaluation result, and the evaluating of the status information of the virtual machine to be migrated comprising:

receiving an evaluation request sent from the target host platform, wherein the evaluation request carries evaluation requirements from the target host platform for the virtual machine to be migrated; wherein the evaluation requirements comprise mandatory evaluation attributes, and the mandatory evaluation attributes comprise owner of the virtual machine, use of the virtual machine, and information of historical host platforms of the virtual machine;

acquiring information of attributes to be evaluated from the virtual machine to be migrated and the source host platform of the virtual machine to be migrated according to the evaluation requirements carried in the evaluation request, wherein the information of the attributes to be evaluated comprises at least mandatory evaluation attributes; and obtaining the status information evaluation result according to a result obtained by comparing the required information of attributes to be evaluated and a corresponding evaluation standard, wherein the obtaining of the status information evaluation result comprising;

determining whether the owner of the virtual machine to be migrated and an owner of a virtual machine that runs on the target host platform belong to the same owner group; if yes, determining that the evaluation for the mandatory evaluation attribute is passed; if no, determining that the evaluation is not passed;

matching tasks that are performed by the virtual machine to be migrated and are acquired from the source host platform or the virtual machine to be migrated with types of task supported by the target host platform, and if the tasks that are performed by the virtual machine do match the types of task supported by the target host platform, determining that the evaluation for the mandatory evaluation attribute is passed;

if the tasks that are performed by the virtual machine do not match the types of task supported by the target host platform, determining that the evaluation is not passed;

matching information of a first historical host platform acquired from the source host platform with corresponding time logs of security events, and if there is no security event occurred when the virtual machine to be migrated is running on each historical host platform, or if there is a security event occurred when the virtual machine to be migrated is running on a historical host platform, and the security level of the occurred security event is in a scope of the security level of the security event of the target host platform;

determining that the evaluation for the mandatory evaluation attribute is passed;

if the security level of the occurred security event is not in a scope of the security level of the security event of the target host platform, determining that the evaluation is not passed;

determining that the status information evaluation is passed if the evaluations for the mandatory evaluation attributes are all passed;

determining that the status information evaluation.

29. The apparatus according to claim 28, wherein the acquisition unit is a status information evaluation sub-unit, configured to evaluate status information of the virtual machine to be migrated, to obtain a status information evaluation result of the virtual machine to be migrated.

30. The apparatus according to claim 29, wherein the status information evaluation sub-unit is specifically configured to receive an evaluation request sent from the target host platform, and the evaluation request carries evaluation requirements from the target host platform for the virtual machine to be migrated; acquire information of attributes to be evaluated from the virtual machine to be migrated and the source host platform of the virtual machine to be migrated according to the evaluation requirements carried in the evaluation request; and obtain the status information evaluation result according to a result obtained by comparing the acquired information of the attributes to be evaluated and a corresponding evaluation standard;

the migration decision-making unit is specifically configured to make a decision that the virtual machine is permitted to be migrated, if the first evaluation result of the source host platform, the second evaluation result of the target host platform, and the status information evaluation result of the virtual machine to be migrated all indicate that evaluation is passed; to make a decision that the virtual machine is not permitted to be migrated, if the first evaluation result of the source host platform, the second evaluation result of the target host platform, and the status information evaluation result of the virtual machine to be migrated not all indicate that evaluation is passed.

31. The apparatus according to claim 28, wherein the acquisition unit is an integrity validation sub-unit, configured to perform integrity validation on the virtual machine to be migrated on the source host platform, to obtain a first integrity validation result of the virtual machine to be migrated.

32. The apparatus according claim 31, wherein:
the migration decision-making unit is specifically configured to make a decision that the virtual machine is permitted to be migrated, if the first evaluation result of the source host platform, the second evaluation result of the target host platform, and the first integrity validation result of the virtual machine to be migrated all indicate that evaluation is passed; to make a decision that the virtual machine is not permitted to be migrated, if the first evaluation result of the source host platform, the second evaluation result of the target host platform, and the first integrity validation result of the virtual machine to be migrated not all indicate that evaluation is passed.

33. The apparatus according to claim 28, wherein the acquisition unit comprises a status information evaluation sub-unit, configured to evaluate status information of the virtual machine to be migrated, to obtain a status information evaluation result; and an integrity validation sub-unit, configured to perform integrity validation on the virtual machine to be migrated on the source host platform, to obtain a first integrity validation result of the virtual machine to be migrated.

34. The apparatus according claim 33, wherein:
the migration decision-making unit is specifically configured to make a decision that the virtual machine is permitted to be migrated, if the first evaluation result of the source host platform, the second evaluation result of the target host platform, the status information evaluation result of the virtual machine to be migrated, and the first integrity validation result of the virtual machine to be migrated all indicate that evaluation is passed; to make a decision that the virtual machine is not permitted to be migrated, if the first evaluation result of the source host platform, the second evaluation result of the target host platform, the status information evaluation result of the virtual machine to be migrated, and the first integrity validation result of the virtual machine to be migrated not all indicate that evaluation is passed.

35. The apparatus according to claim 28, wherein the acquisition unit is a second receiving unit, configured to receive a status information evaluation result of the virtual machine to be migrated sent from the target host platform or the source host platform.

36. The apparatus according to claim 28, wherein the acquisition unit is a second receiving unit, configured to receive a first integrity validation result of the virtual machine to be migrated sent from the target host platform or the source host platform.

37. The apparatus according to claim 28, wherein the acquisition unit is a second receiving unit, configured to receive a status information evaluation result of the virtual machine to be migrated and a first integrity validation result of the virtual machine to be migrated sent from the target host platform or the source host platform.

38. The apparatus according to claim 28, wherein the acquisition unit comprises a status information evaluation sub-unit, configured to evaluate status information of the virtual machine to be migrated, to obtain a status information evaluation result; and a first receiving sub-unit, configured to receive a first integrity validation result of the virtual machine to be migrated sent from the source host platform or the target host platform.

39. The apparatus according to claim 28, wherein the acquisition unit comprises a second receiving sub-unit, configured to receive a status information evaluation result of the virtual machine to be migrated sent from the source host platform or the target host platform; and an integrity validation sub-unit, configured to perform integrity validation on the virtual machine to be migrated on the source host platform, to obtain a first integrity validation result of the virtual machine to be migrated.

* * * * *